US011978196B2

(12) United States Patent
Sun et al.

(10) Patent No.: US 11,978,196 B2
(45) Date of Patent: May 7, 2024

(54) SEE-THROUGH METROLOGY SYSTEMS, APPARATUS, AND METHODS FOR OPTICAL DEVICES

(71) Applicant: Applied Materials, Inc., Santa Clara, CA (US)

(72) Inventors: Yangyang Sun, San Jose, CA (US); Jinxin Fu, Fremont, CA (US); Kazuya Daito, Milpitas, CA (US); Ludovic Godet, Sunnyvale, CA (US)

( * ) Notice: Subject to any disclaimer, the term of this patent is extended or adjusted under 35 U.S.C. 154(b) by 243 days.

(21) Appl. No.: 17/492,857

(22) Filed: Oct. 4, 2021

(65) Prior Publication Data

US 2022/0120700 A1 Apr. 21, 2022

Related U.S. Application Data

(60) Provisional application No. 63/092,421, filed on Oct. 15, 2020.

(51) Int. Cl.
*G06T 7/00* (2017.01)
*G01J 1/42* (2006.01)
(Continued)

(52) U.S. Cl.
CPC ............... *G06T 7/001* (2013.01); *G01J 1/42* (2013.01); *G01J 1/44* (2013.01); *G01N 21/958* (2013.01); *G02B 27/0172* (2013.01); *G06T 7/80* (2017.01); *G06T 7/90* (2017.01); *H04N 23/56* (2023.01); *H04N 23/74* (2023.01); *H04N 23/90* (2023.01);
(Continued)

(58) Field of Classification Search
CPC ........ G01J 1/42; G01J 1/44; G01J 2001/4247; G01N 2021/9583; G01N 21/958; G02B 2027/011; G02B 2027/0112; G02B 2027/0116; G02B 2027/0118; G02B 2027/0138; G02B 2027/014; G02B 2027/0174; G02B 27/0081; G02B 27/017; G02B 27/0172; G06T 2207/10024; G06T 2207/30108; G06T 7/001; G06T 7/80; G06T 7/90; H04N 23/56; H04N 23/74; H04N 23/90
See application file for complete search history.

(56) References Cited

U.S. PATENT DOCUMENTS 10,990,023 B1 * 4/2021 Hsieh ................. G03F 7/70633
2004/0257571 A1 * 12/2004 Mieher ............... G03F 7/70683
356/401

(Continued)

FOREIGN PATENT DOCUMENTS

| JP | 2003263627 A | 9/2003 |
|----|---|---|
| JP | 2005077391 A | 3/2005 |
| KR | 1020080083567 | 9/2008 |

OTHER PUBLICATIONS

International Search Report and Written Opinion dated Jan. 20, 2022 for Application No. PCT/US2021/053354.

(Continued)

*Primary Examiner* — Peter B Kim
(74) *Attorney, Agent, or Firm* — Patterson + Sheridan, LLP

(57) ABSTRACT

Embodiments of the present disclosure relate to optical devices for augmented, virtual, and/or mixed reality applications. In one or more embodiments, an optical device metrology system is configured to measure a plurality of see-through metrics for optical devices.

20 Claims, 20 Drawing Sheets

(51) Int. Cl.
*G01J 1/44* (2006.01)
*G01N 21/958* (2006.01)
*G02B 27/01* (2006.01)
*G06T 7/80* (2017.01)
*G06T 7/90* (2017.01)
*H04N 23/56* (2023.01)
*H04N 23/74* (2023.01)
*H04N 23/90* (2023.01)

(52) U.S. Cl.
CPC ............... *G01J 2001/4247* (2013.01); *G01N 2021/9583* (2013.01); *G02B 2027/0112* (2013.01); *G02B 2027/0118* (2013.01); *G02B 2027/0138* (2013.01); *G02B 2027/014* (2013.01); *G06T 2207/10024* (2013.01); *G06T 2207/30108* (2013.01)

(56) References Cited

U.S. PATENT DOCUMENTS

2015/0160138 A1 6/2015 Takami
2019/0383697 A1 12/2019 Yang et al.
2020/0141802 A1 5/2020 Fu et al.

OTHER PUBLICATIONS

International Search Report and Written Opinion dated Jan. 28, 2022 for Application No. PCT/US2021/053356.
International Search Report and Written Opinion dated Jan. 10, 2022 for Application No. PCT/US2021/053364.
International Search Report and Written Opinion dated Jan. 3, 2022 for Application No. PCT/US2021/053366.
Rash et al. Eval of Microvision Spectrum SD2500 Helmet-Mounted Display for Air Warrior Block 3 Day-Night HMD Program, USAARL Report No. 2006-08, USAARL Report No. 2006-08.

* cited by examiner

SEE-THROUGH METROLOGY SYSTEMS, APPARATUS, AND METHODS FOR OPTICAL DEVICES

CROSS-REFERENCE TO RELATED APPLICATIONS

This application claims benefit of U.S. provisional patent application Ser. No. 63/092,421, filed Oct. 15, 2020, which is herein incorporated by reference in its entirety.

BACKGROUND

Field

Embodiments of the present disclosure relate to optical devices for augmented, virtual, and/or mixed reality applications. In one or more embodiments, an optical device metrology system is configured to measure a plurality of see-through metrics for optical devices.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment. Augmented waveguide combiners are used to assist in overlaying images. Generated light is in-coupled into an augmented waveguide combiner, propagated through the augmented waveguide combiner, out-coupled from the augmented waveguide combiner, and overlaid on the ambient environment. Light is coupled into and out of augmented waveguide combiners using surface relief gratings. The intensity of the out-coupled light may not be adequately controlled.

Accordingly, there is a need in the art for optical device metrology systems and methods.

SUMMARY

Embodiments of the present disclosure relate to optical devices for augmented, virtual, and/or mixed reality applications. In one or more embodiments, an optical device metrology system is configured to measure a plurality of see-through metrics for optical devices.

In one implementation, an optical device metrology system includes a stage configured to move a tray along a stage path, a light engine mounted above the stage path and configured to direct light beams toward the stage path, and a patterned substrate positioned below the stage path. The patterned substrate includes a pattern design formed thereon. The optical device metrology system includes a detector mounted above the stage path and configured to receive projected light beams projected from the stage path, and a controller in communication with the stage, the light engine, and the detector. The controller includes instructions that, when executed, cause the stage to position positioning an optical device below the detector to align the optical device with the detector, and the stage to position the optical device above the patterned substrate at a distance from the patterned substrate. The instructions also cause the detector to capture a plurality of first images of projected light beams that project from the optical device while the patterned substrate is at least partially aligned with the detector. The plurality of first images capture a red spectrum, a green spectrum, and a blue spectrum of the projected light beams. The instructions also cause processing of the plurality of first images to determine a plurality of see-through metrics of the optical device. The plurality of see-through metrics include a see-through flare metric, a see-through distortion metric, a see-through transmittance metric, and a see-through ghost image metric.

In one implementation, an optical device metrology system includes a stage configured to move a tray along a stage path, and a light engine mounted above the stage path and configured to direct light beams toward the stage path. The optical device metrology system also includes a patterned substrate positioned below the stage path. The patterned substrate includes a pattern design formed thereon. The optical device metrology system includes a detector mounted above the stage path and configured to receive projected light beams projected from the stage path.

In one implementation, a method of analyzing optical devices includes positioning an optical device below a detector to align the optical device with the detector, and positioning the optical device above a patterned substrate at a distance from the patterned substrate. The patterned substrate includes a pattern design formed thereon. The method includes capturing a plurality of first images of projected light beams that project from the optical device using a detector while the patterned substrate is at least partially aligned with the detector. The plurality of first images capture a red spectrum, a green spectrum, and a blue spectrum of the projected light beams. The method includes processing of the plurality of first images to determine one or more see-through metrics of the optical device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure relate to optical devices for augmented, virtual, and/or mixed reality applications. In one or more embodiments, an optical device metrology system is configured to measure a plurality of see-through metrics for optical devices.

Figure 1A:
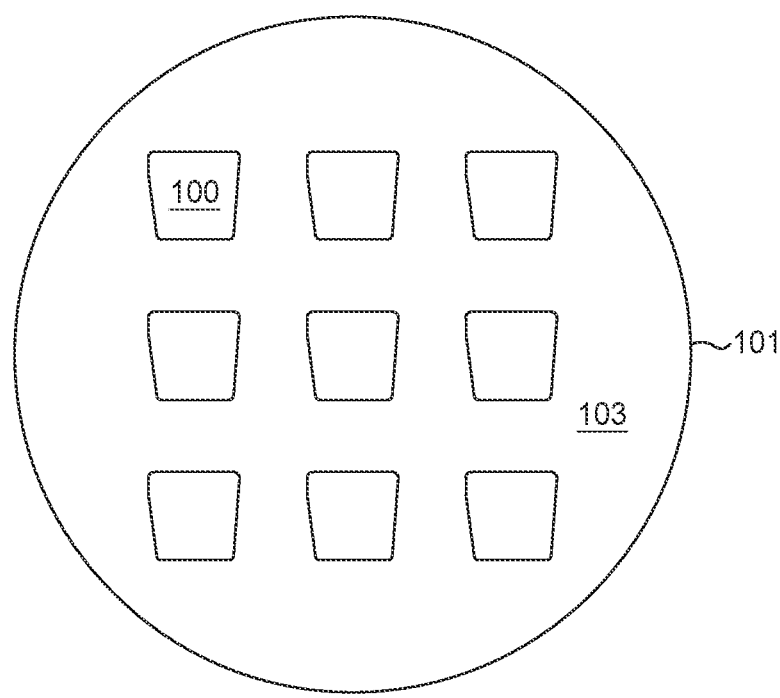
FIG. 1A is a perspective, frontal view of a substrate, according to one implementation.

FIG. 1A is a perspective, frontal view of a substrate 101, according to one implementation. The substrate includes a plurality of optical devices 100 disposed on a surface 103 of the substrate 101. The optical devices 100 are waveguide combiners utilized for virtual, augmented, and/or mixed reality. The optical devices 100 may be part of the substrate 101 such that the optical devices 100 can be cut to be separated from the substrate 101.

Figure 1B:
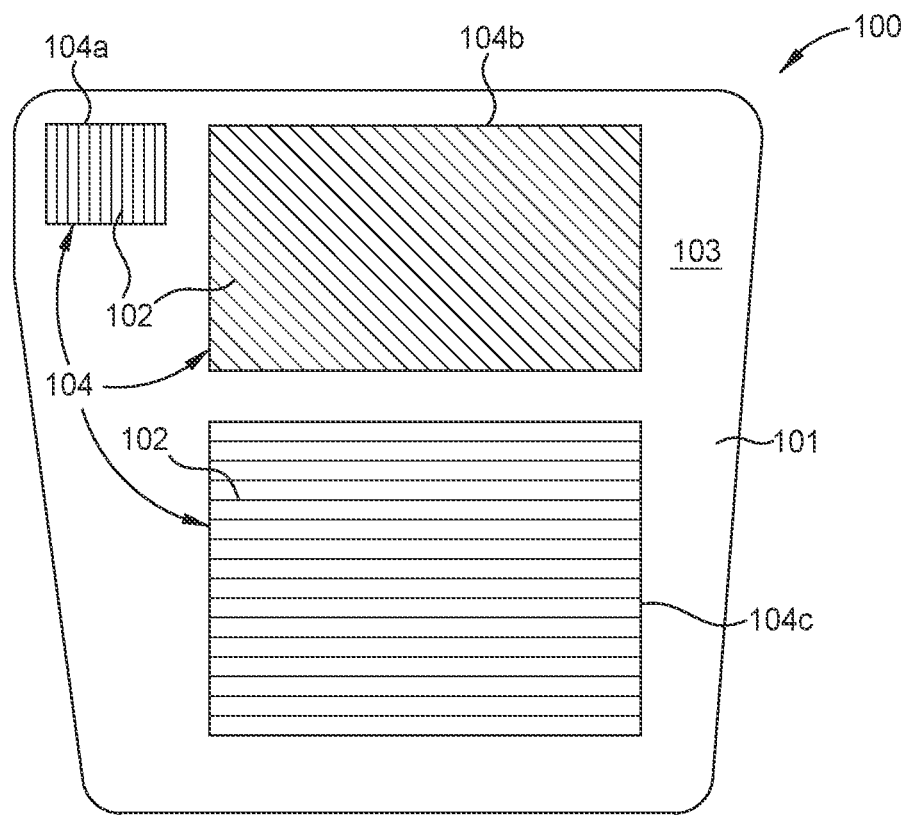
FIG. 1B is a perspective, frontal view of an optical device, according to one implementation.

FIG. 1B is a perspective, frontal view of an optical device 100, according to one implementation. It is to be understood that the optical devices 100 described herein are exemplary optical devices and that other optical devices (such as optical devices other than waveguide combiners) may be used with or modified to accomplish aspects of the present disclosure.

The optical device 100 includes a plurality of optical device structures 102 disposed on a surface 103 of a substrate 101. The optical device structures 102 may be nano-structures having sub-micron dimensions (e.g., nano-sized dimensions). Regions of the optical device structures 102 correspond to one or more gratings 104, such as a first grating 104a, a second grating 104b, and a third grating 104c. In one embodiment, which can be combined with other embodiments, the optical device 100 includes at least the first grating 104a corresponding to an input coupling grating and the third grating 104c corresponding to an output coupling grating. In one embodiment, which can be combined with other embodiments described herein, the optical device 100 also includes the second grating 104b corresponding to an intermediate grating. The optical device structures 102 may be angled or binary. The optical device structures 102 are rectangular. The optical device structures 102 may have other shapes including, but not limited to, circular, triangular, elliptical, regular polygonal, irregular polygonal, and/or irregular shaped cross-sections.

In operation (such as for augmented reality glasses), the input coupling grating 104a receives incident beams of light (a virtual image) having an intensity from a microdisplay. The incident beams are split by the optical device structures 102 into T1 beams that have all of the intensity of the incident beams in order to direct the virtual image to the intermediate grating 104b (if utilized) or the output coupling grating 104c. In one embodiment, which can be combined with other embodiments, the T1 beams undergo total-internal-reflection (TIR) through the optical device 100 until the T1 beams come in contact with the optical device structures 102 of the intermediate grating 104b. The optical device structures 102 of the intermediate grating 104b diffract the T1 beams to T−1 beams that undergo TIR through the optical device 100 to the optical device structures 102 of the output coupling grating 104c. The optical device structures 102 of the output coupling grating 104c outcouple the T−1 beams to the user's eye to modulate the field of view of the virtual image produced from the microdisplay from the user's perspective and further increase the viewing angle from which the user can view the virtual image. In one embodiment, which can be combined with other embodiments, the T1 beams undergo total-internal-reflection (TIR) through the optical device 100 until the T1 beams come in contact with the optical device structures 102 of the output coupling grating and are outcoupled to modulate the field of view of the virtual image produced from the microdisplay.

To facilitate ensuring that the optical devices 100 meet image quality standards, metrology metrics of the fabricated optical devices 100 are obtained prior to use of the optical devices 100.

Figure 2:
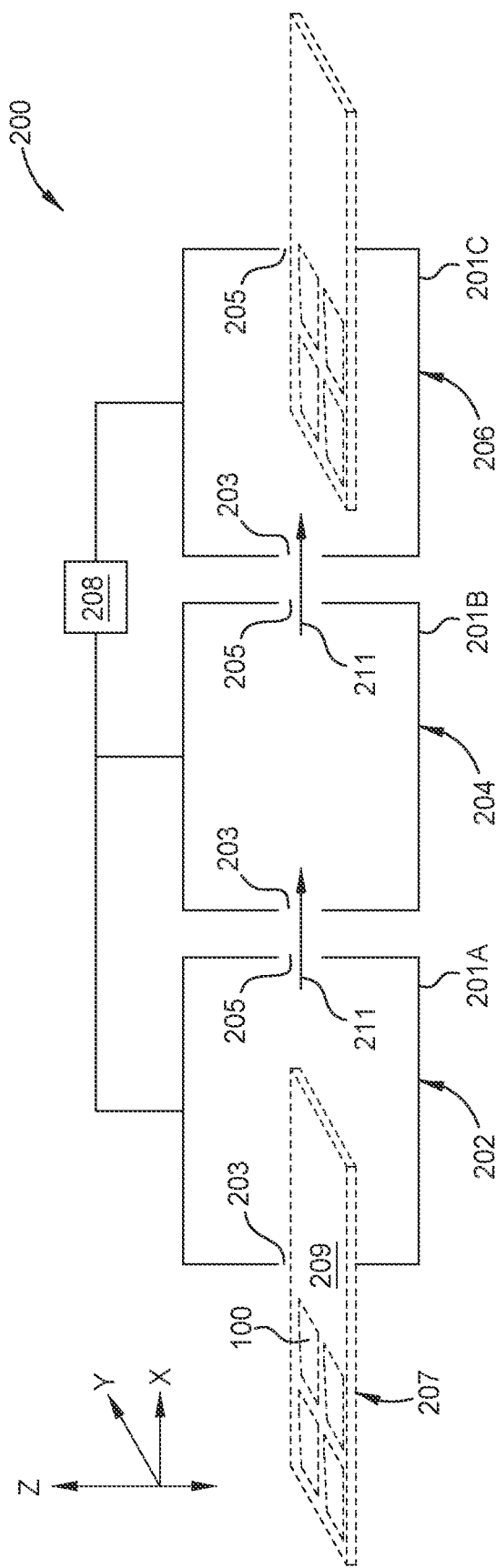
FIG. 2 is a schematic view of an optical device metrology system, according to one implementation.

FIG. 2 is a schematic view of an optical device metrology system 200, according to one implementation. Embodiments of the optical device metrology system 200 described herein provide for the ability to obtain multiple metrology metrics with increased throughput. The metrology metrics include an angular uniformity metric, a contrast metric, an efficiency metric, a color uniformity metric, a modulation transfer function (MTF) metric, a field of view (FOV) metric, a ghost image metric, an eye box metric, a display leakage metric, a see-through distortion metric, a see-through flare metric, a see-through ghost image metric, and a see-through transmittance metric. The throughput is increased via the utilization of a feeding system coupled to each of one or more subsystems of the optical device metrology system 200.

The optical device metrology system 200 includes a first subsystem 202, a second subsystem 204, and a third subsystem 206. Each of the first subsystem 202, the second subsystem 204, and the third subsystem 206 include a respective body 201A-201C with a first opening 203 and a second opening 205 to allow a stage 207 to move therethrough along a stage path 211 that is parallel to and/or in the X-Y plane. The stage 207 is operable to move in an X-direction, a Y-direction, and a Z-direction in the bodies 201A-201C of the first subsystem 202, the second subsystem 204, and the third subsystem 206. The stage 207 includes a tray 209 operable to retain the optical devices 100 (as shown herein) or one or more substrates 101. The stage 207 and the tray 209 may be transparent such that the metrology metrics obtained by the first subsystem 202, the second subsystem 204, and the third subsystem 206 are not impacted by the translucence of the stage 207 of the tray 209. The first subsystem 202, the second subsystem 204, and the third subsystem 206 are in communication with a controller 208 operable to control operation of the first subsystem 202, the second subsystem 204, and the third subsystem 206. The controller 208 includes instructions stored in a non-transitory computer readable medium (such as a memory). The instructions, when executed by a processor of the controller 208, cause operations described herein to be conducted. The instructions, when executed by the processor of the controller 208, cause one or more operations of one or more of the methods 1000, 1100, and/or 1200 to be conducted.

The instructions of the controller 208 include a machine learning algorithm and/or an artificial intelligence algorithm to optimize operations. In one embodiment, which can be combined with other embodiments, the instructions of the controller 208 include a machine learning (ML) model that is a regression model and averages data (such as metrics determined herein and/or image data collected using the alignment module 494). In one example, which can be combined with other examples, the ML model is used to average and merge data to determine optimized pitches and tilts for projection structures, lenses, and cameras. In one example, which can be combined with other examples, the ML model is used to average and merge data to determine optimized powers to apply to light sources and laser sources to generate light beams and laser beams.

The first subsystem 202 is operable to obtain one or more metrology metrics including the angular uniformity metric, the contrast metric, the efficiency metric, the color uniformity metric, the MTF metric, the FOV metric, the ghost image metric, or the eye box metric. The second subsystem 204 is operable to obtain the display leakage metric. The third subsystem 206 is operable to obtain one or more see-through metrology metrics including the see-through distortion metric, the see-through flare metric, the see-through ghost image metric, or the see-through transmittance metric.

The optical device metrology system 200 is configured to determine a display leakage metric, one or more see-through metrics, and one or more other metrology metrics for a plurality of optical devices (such as waveguide combiners) on a single system using a single stage path 211.

Figure 3A:
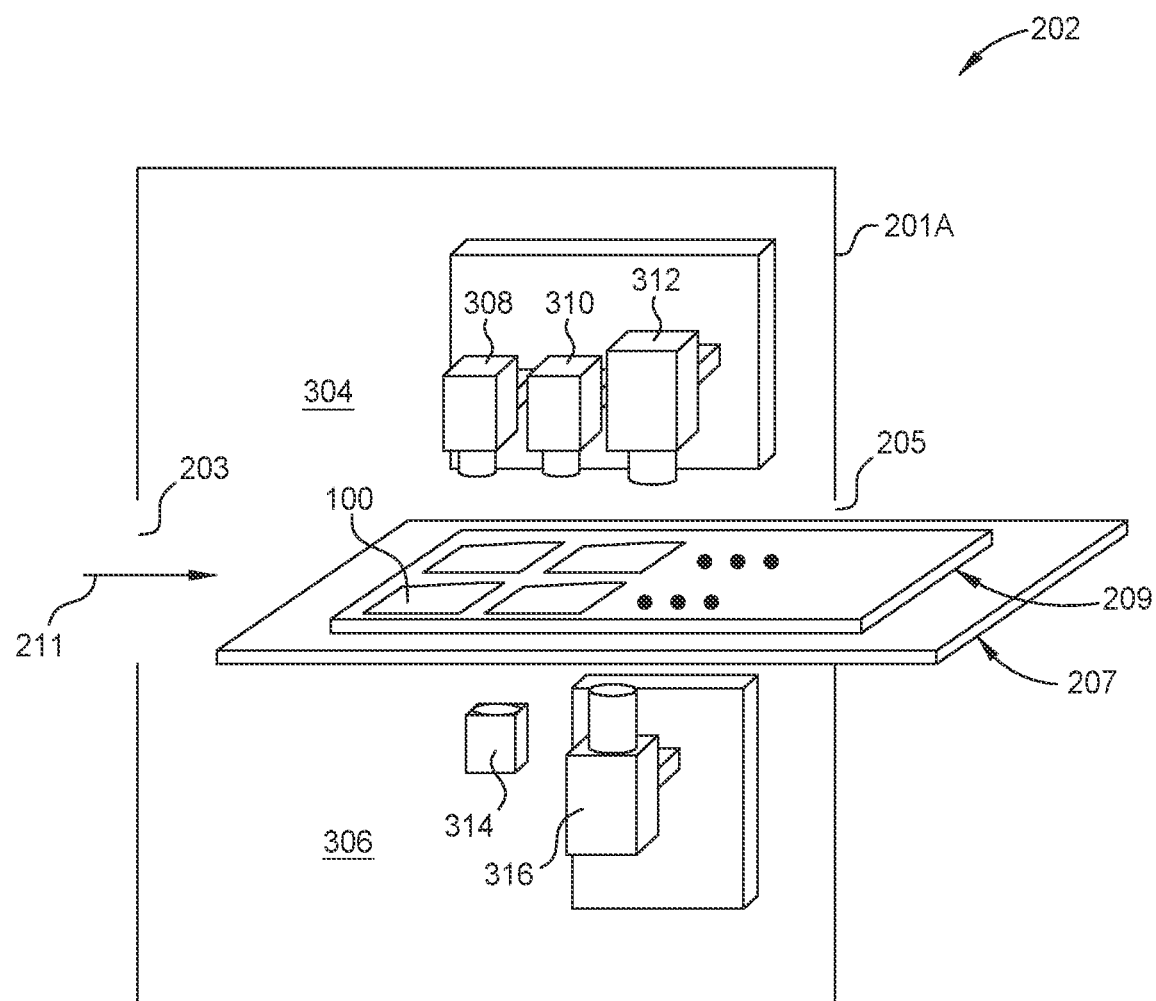
FIG. 3A is a schematic partial cross-sectional view of the first subsystem shown in FIG. 2, according to one implementation.

FIG. 3A is a schematic partial cross-sectional view of the first subsystem 202 shown in FIG. 2, according to one implementation. The first subsystem 202 may include one or more of configurations 400A, 400B, 400C, 400D shown in FIGS. 4A-4D.

As shown in FIG. 3A, the first subsystem 202 includes an upper portion 304 oriented toward a top side of the optical devices 100 and a lower portion 306 oriented toward a bottom side of the optical device 100.

The first subsystem 202 includes a first body 201A having a first opening 203 and a second opening 205 to allow the stage 207 to move through the first opening 203 and the second opening 205. The stage 207 is configured to move the tray 209 along the stage path 211. The first subsystem 202 includes a first light engine 310 positioned within the first body 201A and mounted above the stage path 211. The first light engine 310 is an upper light engine. The first light engine 310 configured to direct first light beams toward the stage path 211. In one embodiment, which can be combined with other embodiments, the first light beams are directed in a light pattern design toward the stage path 211 and toward one of the optical devices 100 for determination of metrology metrics. The first subsystem 202 includes a first detector 312 positioned within the first body 201A and mounted above the stage path 211 to receive first projected light beams projected upwardly from the stage path 211. The present disclosure contemplates that projected light can be light that is reflected from an optical device or transmitted through an optical device. The first detector 312 is a reflection detector. The first subsystem 202 includes a second detector 316 positioned within the first body 201A and mounted below the stage path 211 to receive second projected light beams projected downwardly from the stage path 211. The second detector 316 is a transmission detector. The first projected light beams and the second projected light beams are projected from an optical device 100. In one embodiment, which can be combined with other embodiments, the first light engine 310 is configured to direct the first light beams toward the input coupling grating of an optical device 100, and the first and second detectors 312, 316 are configured to receive projected light beams that project from the output coupling grating of the optical device 100.

The upper portion 304 of the first subsystem 202 includes an alignment detector 308. The alignment detector 308 includes a camera. The alignment detector 308 is operable to determine a position of the stage 207 and the optical devices 100. The lower portion 306 of the first subsystem 202 includes a code reader 314 mounted below the stage path 211. The code reader 314 is operable to read a code of the optical devices 100, such as a quick response (QR) code or barcode of an optical device 100. The code read by the code reader 314 may include instructions for obtaining one or more metrology metrics for various optical devices 100.

Figure 3B:
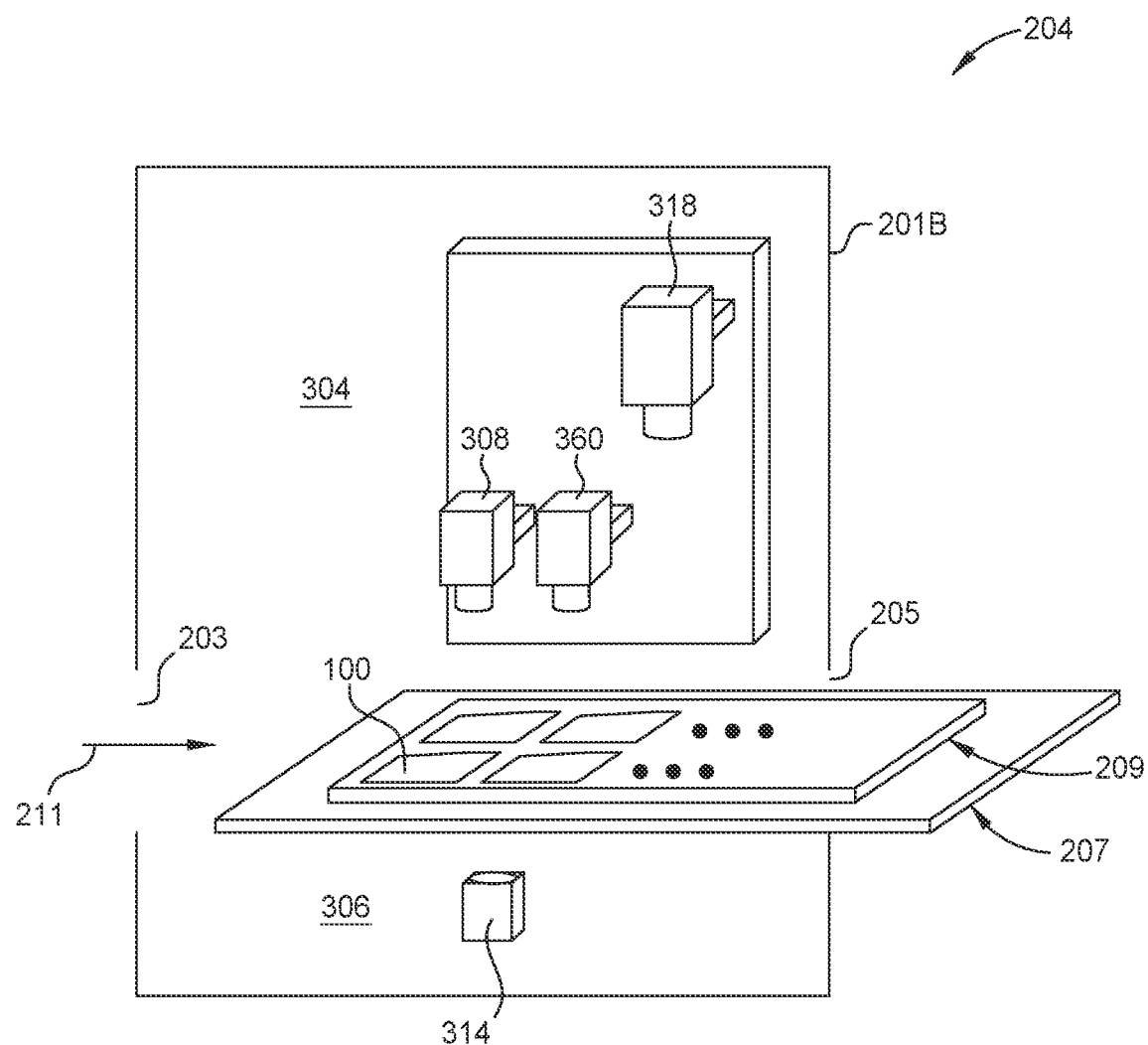
FIG. 3B is a schematic partial cross-sectional view of the second subsystem shown in FIG. 2, according to one implementation.

FIG. 3B is a schematic partial cross-sectional view of the second subsystem 204 shown in FIG. 2, according to one implementation. The second subsystem 204 may include at least one configuration 400E as shown in FIG. 4E.

As shown in FIG. 3B, the second subsystem 204 includes the upper portion 304 oriented toward a top side of the optical devices 100 and a lower portion oriented to toward a bottom side of the optical device 100.

The second subsystem 204 includes a second body 201B and a second light engine 360 positioned within the second body 201B and mounted above the stage path 211. The second light engine 360 configured to direct second light beams toward the stage path 211. The upper portion 304 of the first subsystem 202 includes the alignment detector 308.

The second subsystem 204 includes a face illumination detector 318 configured to receive third projected light beams projected upwardly from the stage path 211. The third projected light beams are projected from an optical device 100. The lower portion 306 of the second subsystem 204 includes the code reader 314.

The face illumination detector 318 is operable to capture images to obtain the display leakage metric for the optical device 100. In one embodiment, which can be combined with other embodiments, a light pattern design is directed from the second light engine 360 and toward the optical device 100, and images of light outside a location of the user's eye are obtained and processed to obtain an eye box metric.

Figure 3C:
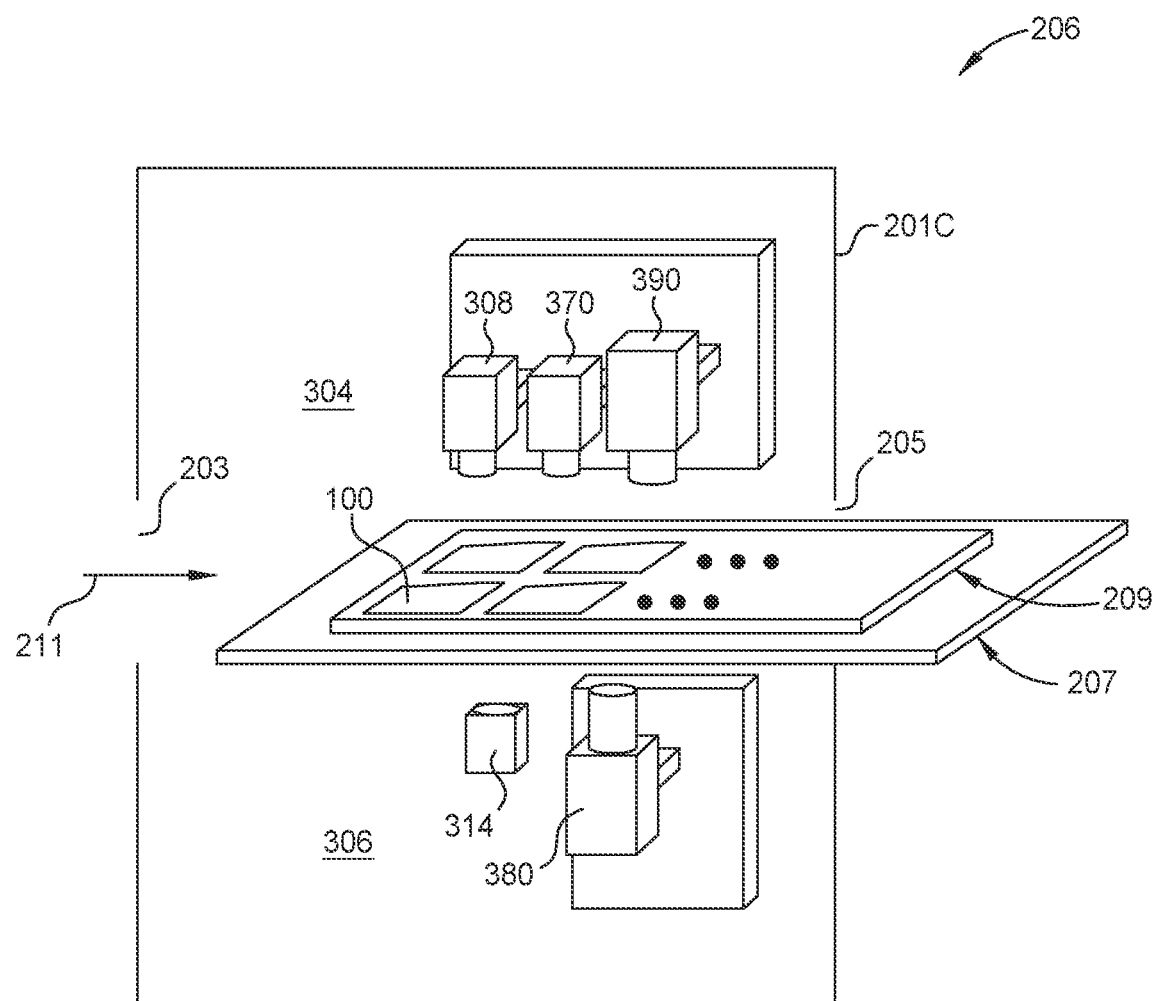
FIG. 3C is a schematic partial cross-sectional view of the third subsystem shown in FIG. 2, according to one implementation.

FIG. 3C is a schematic partial cross-sectional view of the third subsystem 206 shown in FIG. 2, according to one implementation. The third subsystem 206 may include one or more configurations 400F and/or 400G as shown in FIGS. 4F and 4G.

As shown in FIG. 3C, the third subsystem 206 includes an upper portion 304 oriented toward a top side of the optical devices 100 and a lower portion 306 oriented toward a bottom side of the optical device 100. The third subsystem 206 includes a third first light engine 370 mounted above the stage path 211 and configured to direct upper light beams toward the stage path 211, a fourth light engine 380 mounted below the stage path 211 and configured to direct lower light beams toward the stage path 211, and a detector 390 mounted above the stage path and configured to receive projected light beams projected from the stage path 211. The upper portion 304 of the third subsystem 206 includes the alignment detector 308. The detector 390 is a reflection detector. The detector 390 detects projected (e.g., reflected) light beams that project (e.g., reflect) from the output coupling grating from the top side of the optical devices 100. The lower portion 306 of the third subsystem 206 includes the code reader 314. Each of the first third light engine 370, the second fourth light engine 380, and the detector 390 are positioned within a third body 201C of the third subsystem 206.

Figure 4A:
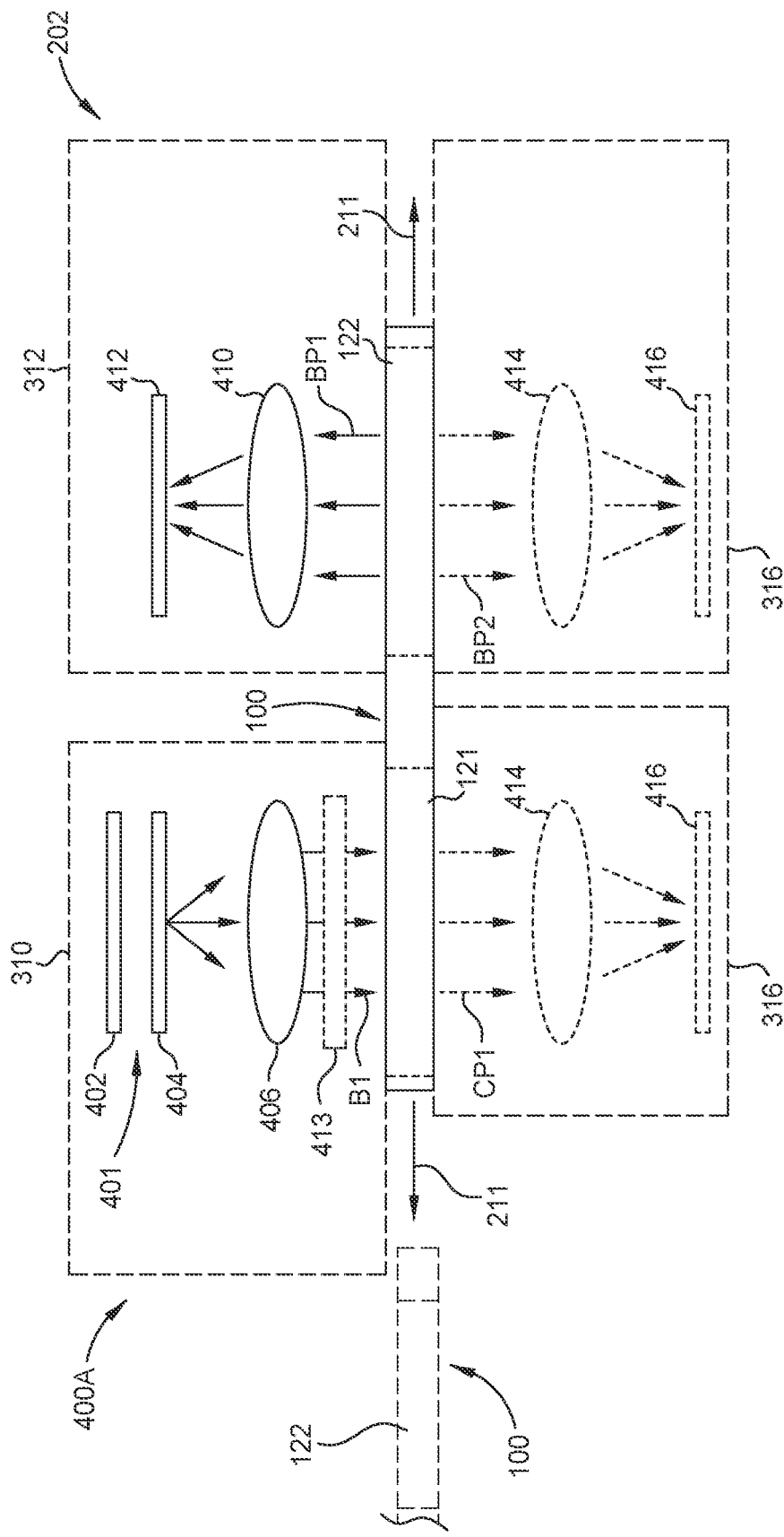
FIG. 4A is a schematic view of a configuration of the first subsystem shown in FIGS. 2 and 3A, according to one implementation.

FIG. 4A is a schematic view of a configuration 400A of the first subsystem 202 shown in FIGS. 2 and 3A, according to one implementation. The configuration 400A includes the first light engine 310, the first detector 312, and the second detector 316.

The first light engine 310 includes a first illuminator 401, and the first illuminator 401 includes a first light source 402 and a first projection structure 404. The first light engine 310 includes a first lens 406 positioned between the first illuminator 401 and the stage path 211. The first light engine 310 includes one or more devices 413 (one is shown in FIG. 4A) positioned between the first lens 406 and the stage path 211. The one or more devices 413 includes one or more of a quarter wave plate or a linear polarizer. In one embodiment, which may be combined with other embodiments described herein, the first light engine 310 is configured to emit (e.g., project) light beams in a red spectrum, a green spectrum, and a blue spectrum. In one example, which can be combined with other examples, the first light engine 310 is configured to modulate or pulse light beams between the red spectrum, the green spectrum, and the blue spectrum. In one example, which can be combined with other examples, the first light engine 310 includes three light sources that are each configured to respectively emit light in the red spectrum, light in the green spectrum, and light in the blue spectrum.

The first projection structure 404 includes one or more of a display and/or a reticle. In one embodiment, which can be combined with other embodiments, the first projection structure 404 includes one or more of a microdisplay, a spatial light modulator (SLM), and/or a reticle. In one example, which can be combined with other examples, the SLM includes one or more of a digital micromirror device (DMD) and/or a liquid crystal on silicon (LCOS) emitter.

The first detector 312 includes a first camera 412 and a second lens 410 positioned between the first camera 412 and the stage path 211. The second detector 316 includes a second camera 416 and a third lens 414 positioned between the second camera 416 and the stage path 211. In the implementation shown in FIG. 4A, the first projection structure 404 and the first lens 406 are oriented parallel to the stage path 211.

The optical device 100 is positioned to align an input coupler 121 of the optical device 100 with the first light engine 310, and to align an output coupler 122 of the optical device 100 with the first detector 312 and the second detector 316. First light beams B1 are directed from the first light engine 310 and toward the input coupler 121 of the optical device 100. The first detector 312 captures a plurality of first images of first projected light beams BP1 that project from the output coupler 122 in the red spectrum, the green spectrum, and the blue spectrum. The second detector 316 captures a plurality of second images of second projected light beams BP2 that project from the output coupler 122 in the red spectrum, the green spectrum, and the blue spectrum.

The first images and the second images are full-field images. One or more of the first images and/or the second images are processed (such as by using the controller 208) to determine a plurality of first metrics of the optical device 100.

The plurality of first metrics include an angular uniformity metric. The angular uniformity metric can represent a ratio of light intensities across sections of light fields. For the angular uniformity metric, the processing of one or more of the plurality of first images or the plurality of second images includes comparing one or more first sections of a light pattern design with one or more second sections of the light pattern design within a single image. For the angular uniformity metric, the first light beams B1 incoupled into the input coupler 121 undergo TIR until the incoupled first light beams B1 are outcoupled (e.g., projected, such as reflected) to the first detector 312.

The plurality of first metrics include a contrast metric. The contrast metric can represent a contrast between the brightest captured light within images and the darkest captured light within images. For the contrast metric, the processing of one or more of the plurality of first images or the plurality of second images includes comparing one or more bright sections of a light pattern design with one or more dark sections of the light pattern design within a single image. For the contrast metric, the first light beams B1 incoupled into the input coupler 121 undergo TIR until the incoupled first light beams B1 are outcoupled (e.g., projected, such as reflected) to the first detector 312.

The plurality of first metrics include a color uniformity metric. The color uniformity metric can represent one or more ratios between the red light, the green light, and the blue light in a field. One or more of the plurality of first images, the plurality of second images, and/or the plurality of third images (described below in relation to FIG. 4E) capture a red spectrum, a green spectrum, and a blue spectrum. For the color uniformity metric, the processing of one or more of the plurality of first images or the plurality of second images includes comparing a red spectrum image with a green spectrum image and a blue spectrum image using the same field area. For the color uniformity metric, the first light beams B1 incoupled into the input coupler 121 undergo TIR until the incoupled first light beams B1 are outcoupled (e.g., projected, such as reflected) to the first detector 312.

The plurality of first metrics include an efficiency metric. For the efficiency metric, prior to the capturing of the plurality of first images and the capturing of the plurality of second images, the second detector 316 is positioned to align with the input coupler 121 of the optical device 100 in a calibration position (shown in ghost for the second detector 316 in FIG. 4A). While the second detector 316 is in the calibration position, the first light engine 310 directs calibration light beams toward the input coupler 121 of the optical device 100, and the second detector 316 captures one or more calibration images of calibration projected light beams CP1 that project from the input coupler 121 of the optical device 100. The one or more calibration images are full-field images. The second detector 316 is then positioned to align with the output coupler 122 of the optical device 100. For the efficiency metric, the first light beams B1 incoupled into the input coupler 121 undergo TIR until the incoupled first light beams B1 are outcoupled (e.g., projected, such as reflected) to the first detector 312 and outcoupled (e.g., projected such as transmitted) to the second detector 316. The first images are reflected images and the second images are transmitted images.

For the efficiency metric, the processing of one or more of the plurality of first images or the plurality of second images includes comparing the one or more calibration images with the plurality of first images and the plurality of second images.

The one or more first metrics include a modulation transfer function (MTF) metric. For the MTF metric, prior to the capturing of the plurality of first images and the capturing of the plurality of second images, directing calibration light beams from the first light engine 301 and toward the second detector 316. The second detector 316 captures one or more calibration images of the calibration light beams while the second detector 316 is misaligned from the optical device 100. The second detector 316 can be in the calibration position shown in ghost in FIG. 4A and aligned with the first light engine 310, while the optical device 100 can be positioned away from the second detector 316 to be out of the fields-of-view of the second detector 316 and the first light engine 310 (as shown in ghost for the optical device 100 in FIG. 4A). The second detector 316 can then be positioned to align with the first detector 312. In one embodiment, which can be combined with other embodiments, the second images are captured prior to the capturing of the first images. For the MTF metric, the first light beams B1 incoupled into the input coupler 121 undergo TIR until the incoupled first light beams B1 are outcoupled (e.g., projected, such as reflected or transmitted) to the first detector 312 or the second detector 316.

For the MTF metric, the processing of one or more of the plurality of first images or the plurality of second images includes comparing an outer edge of one or more sections of the one or more calibration images with the same outer edge of the same one or more sections of one or more of the plurality of first images or the plurality of second images.

The plurality of first metrics include an eye box metric. For the eye box metric, the first detector 312 or the second detector 316 is moved to scan across a plurality of locations along the output coupler 122 of the optical device 100 during the capturing of the plurality of first images or the capturing of the plurality of second images. The processing of one or more of the plurality of first images or the plurality of second images includes comparing different images that correspond to different field areas of the output coupler 122. For the eye box metric, the first light beams B1 incoupled into the input coupler 121 undergo TIR until the incoupled first light beams B1 are outcoupled (e.g., projected, such as reflected or transmitted) to the first detector 312 or the second detector 316.

The plurality of first metrics include a ghost image metric. For the ghost image metric, prior to the capturing of the plurality of first images and the capturing of the plurality of second images, calibration light beams are directed from the first light engine 310 and toward the second detector 316. The second detector 316 captures one or more calibration images of the calibration light beams while the second detector 316 is misaligned from the optical device 100. The second detector 316 can be in the calibration position shown in ghost in FIG. 4A and aligned with the first light engine 310, while the optical device 100 can be positioned away from the second detector 316 to be out of the fields-of-view of the second detector 316 and the first light engine 310 (as shown in ghost for the optical device 100 in FIG. 4A). The second detector 316 can then be positioned to align with the first detector 312. In one embodiment, which can be combined with other embodiments, the second images are captured prior to the capturing of the first images.

For the ghost image metric, the processing of one or more of the plurality of first images or the plurality of second images includes comparing the one or more calibration images with one or more of the plurality of first images or the plurality of second images to determine an offset between the one or more calibration images and one or more of the plurality of first images or the plurality of second images. In one embodiment, which can be combined with other embodiments, the offset is an offset between a light pattern design (such as a reticle) in the one or more calibration images and the light pattern design (such as a reticle) in the first images or the second images.

Figure 4B:
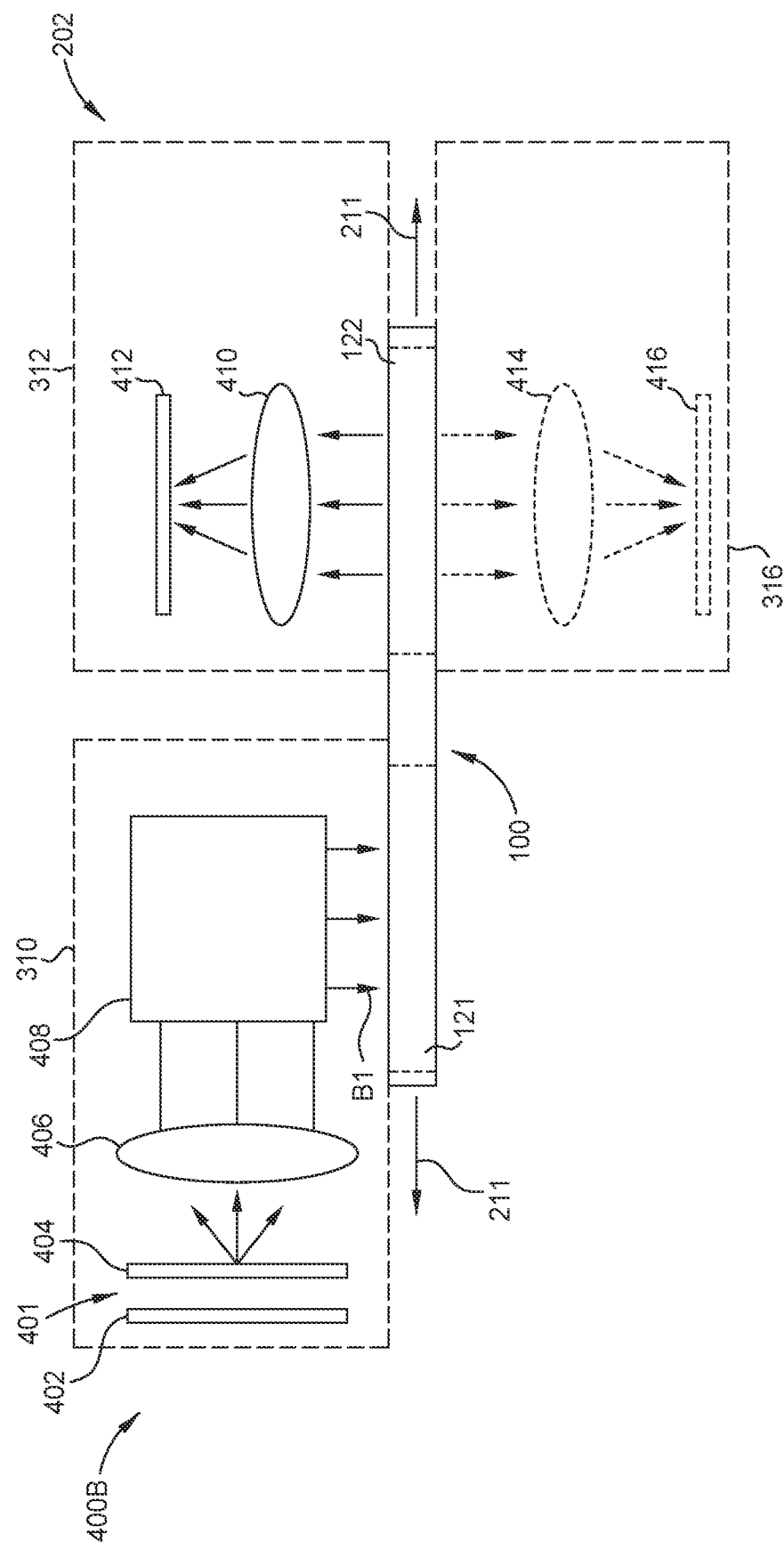
FIG. 4B is a schematic view of a configuration of the first subsystem shown in FIGS. 2 and 3A, according to one implementation.

FIG. 4B is a schematic view of a configuration 400B of the first subsystem 202 shown in FIGS. 2 and 3A, according to one implementation. The configuration 400B includes the first light engine 310, the first detector 312, and the second detector 316. The first light engine 310 includes the first light source 402, the first projection structure 404, and the first lens 406. The first light engine 310 in the configuration 400B includes one or more two-dimensional Galvano mirrors 408 (such as an array of two-dimensional Galvano mirrors) configured to turn the first light beams emitted by the first projection structure 404 along a 90-degree turn toward the stage path 211. In the implementation shown in FIG. 4B, the first projection structure 404 and the first lens 406 are oriented perpendicularly to the stage path 211.

The first detector 312 includes the second lens 410 and the first camera 412. The second detector 316 includes the third lens 414 and the second camera 416. The first light engine 310, using the one or more two-dimensional Galvano mirrors 408, turns the first light beams B1 along a 90 degree turn toward the stage path 211 and toward the input coupler 121 of the optical device 100.

In the implementation shown in FIG. 4B the first lens 406 is positioned between the first illuminator 401 and the stage path 211 along an optical path from the first illuminator and to the stage path 211. The one or more two-dimensional Galvano mirrors 408 are positioned between the first lens 406 and the stage path 211 along the optical path. The optical path includes the 90 degree turn.

Figure 4C:
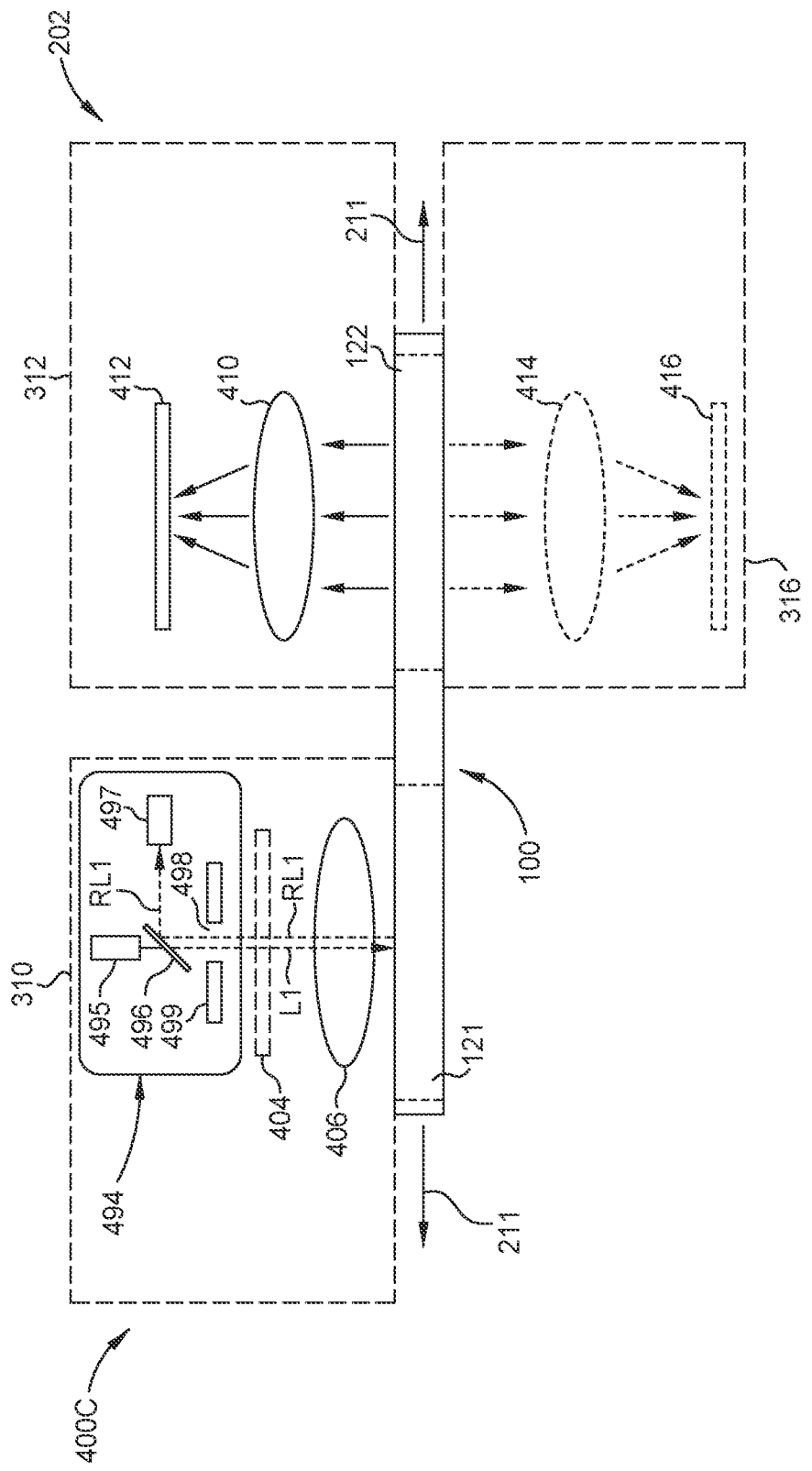
FIG. 4C is a schematic view of a configuration of the first subsystem shown in FIGS. 2 and 3A, according to one implementation.

FIG. 4C is a schematic view of a configuration 400C of the first subsystem 202 shown in FIGS. 2 and 3A, according to one implementation. The configuration 400C is similar to the configuration 400A shown in FIG. 4A, and includes one or more of the aspects, features, components, and/or properties thereof.

The configuration 400C includes an alignment module 494. The alignment module 494 is shown in relation to the first light engine 310 to align the first projection structure 404 and the first lens 406. The alignment module 494 includes a laser source 495, a beam splitter 496, and an alignment detector 497. The alignment module 494 includes a pinhole 498 formed in a plate 499. The alignment detector 497 can include a camera. The alignment module 494 can be used in addition to the alignment detector 308.

The alignment module 494 is used to conduct an alignment operation. In the alignment operation, the first light source 402, the first projection structure 404 and the first lens 406 are moved out of alignment from the input coupler 121 of the optical device 100. The alignment module 494 directs first laser light L1 through the pinhole 498 and toward the optical device 100 using the laser source 495. A light intensity of first reflected laser light RL1 is determined using the alignment detector 497. The first reflected laser light RL1 is that first laser light L1 that reflects off of the optical device 100. The first reflected laser light RL1 is directed to the alignment detector 497 using the beam splitter 496. A tilt and a pitch of the laser source 495 is adjusted to increase the light intensity to an increased light intensity. A first position of the first reflected laser light RL1 received by the alignment detector 497 is determined at the increased light intensity. The first position is a position of the first reflected laser light RL1 within an image that the alignment detector 497 captures of the first reflected laser light RL1.

In the alignment operation, the first lens 406 is moved to be aligned with the input coupler 121 of the optical device 100 (as shown in ghost in FIG. 4C), and second laser light is directed through the pinhole 498 and toward the first lens 406. A tilt and a pitch of the first lens 406 is adjusted until a second position of second reflected laser light received by the alignment detector matches the first position of the first reflected laser light RL1. The second reflected laser light is the second laser light that reflects off of the first lens 406 and back toward the beam splitter 496.

In the alignment operation, the first projection structure 404 is moved to be aligned with the input coupler 121 of the optical device 100 (as shown in ghost in FIG. 4C), and third laser light is directed through the pinhole 498 and toward the first projection structure 404. A tilt and a pitch of the first projection structure 404 is adjusted until a third position of third reflected laser light received by the alignment detector matches the first position of the first reflected laser light RL1. The third reflected laser light is the third laser light that reflects off of the first projection structure 404 and back toward the beam splitter 496.

The alignment module 494 can then be moved out of alignment from the input coupler 121 of the optical device 100, and the first light source 402 can be moved into alignment with the input coupler 121 of the optical device 100. Lenses, projection structures, and cameras can be aligned using the alignment module 494 and the alignment operation to facilitate accurate operations, such as accurate determination of metrics of optical devices 100. The operations described for the alignment operation can be combined with the methods 1000, 1100, 1200 described below.

Figure 4D:
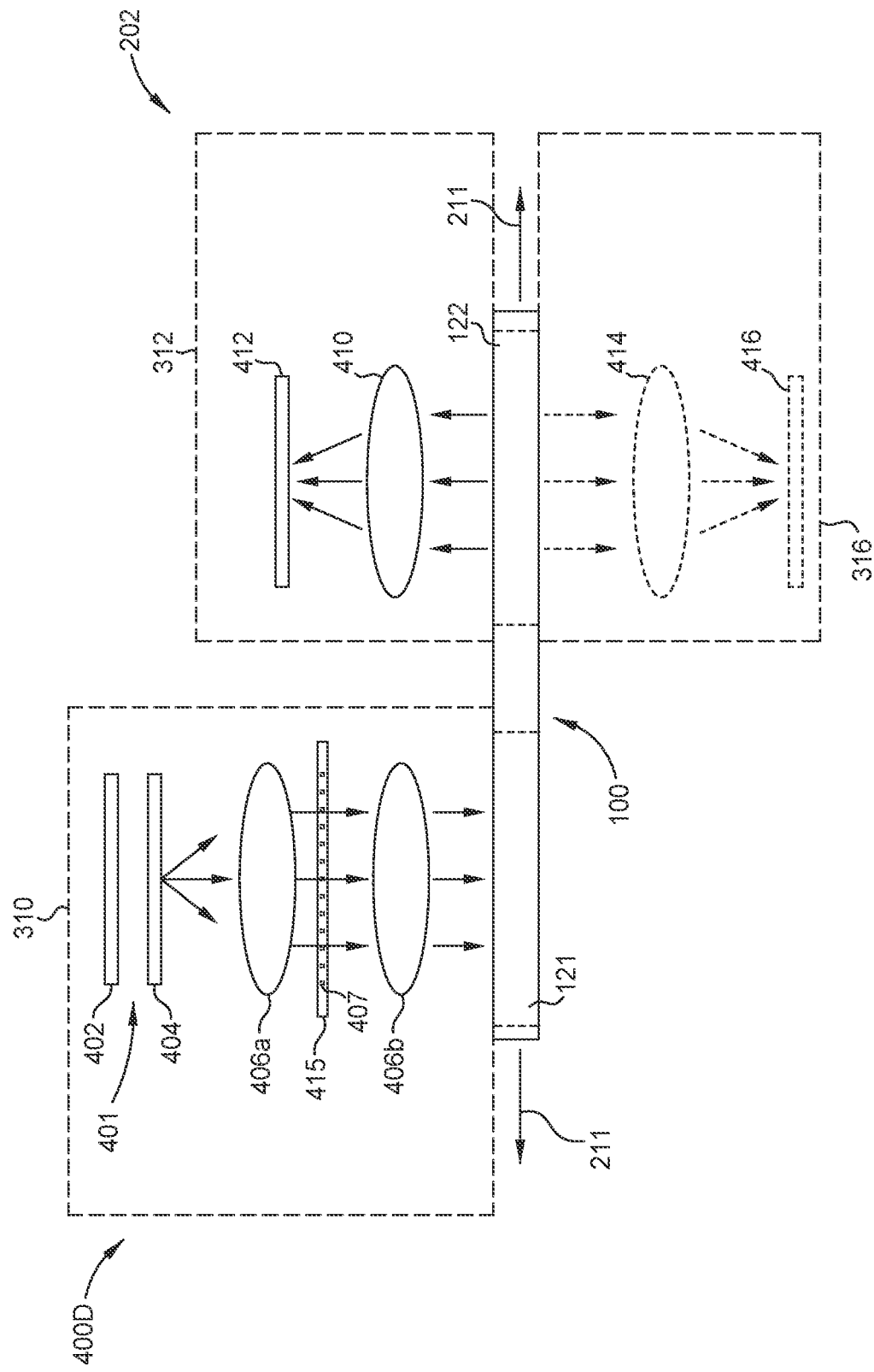
FIG. 4D is a schematic view of a configuration of the first subsystem shown in FIGS. 2 and 3A, according to one implementation.
Figure 4E:
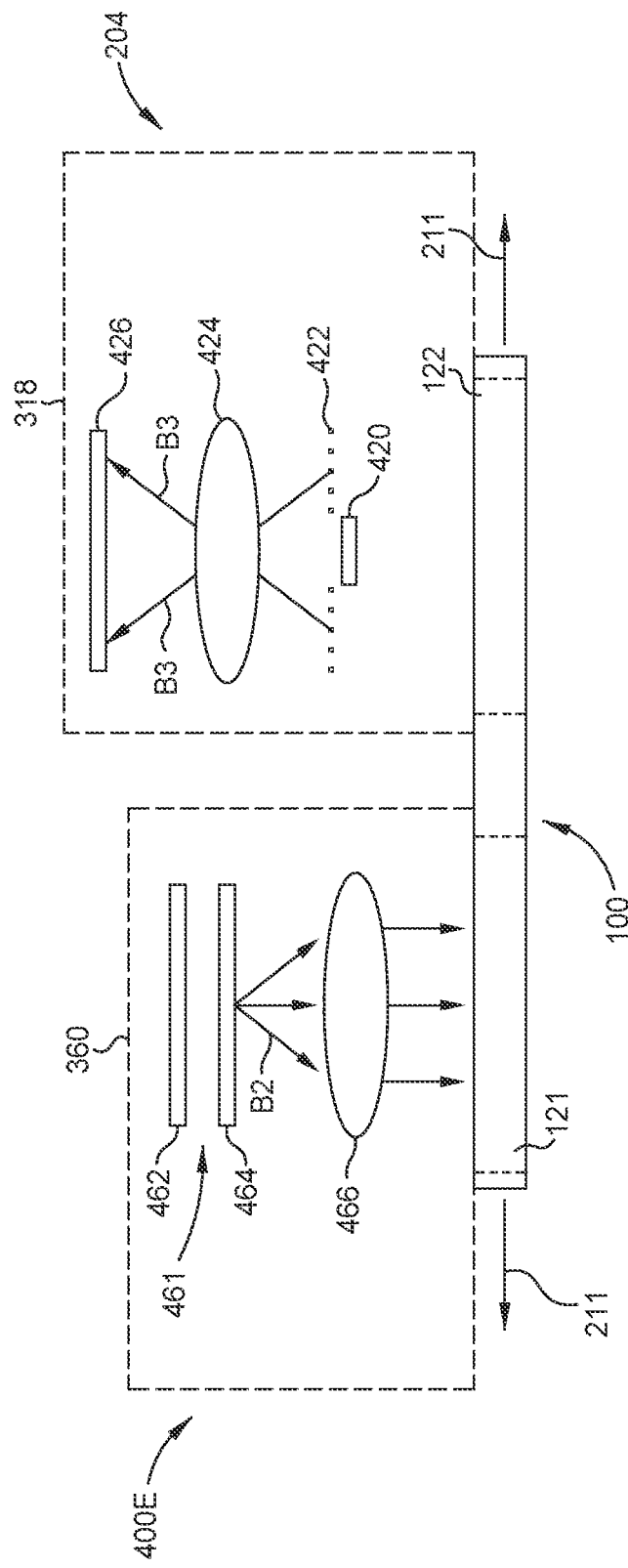
FIG. 4E is a schematic view of a configuration of the second subsystem shown in FIGS. 2 and 3B, according to one implementation.
Figure 4F:
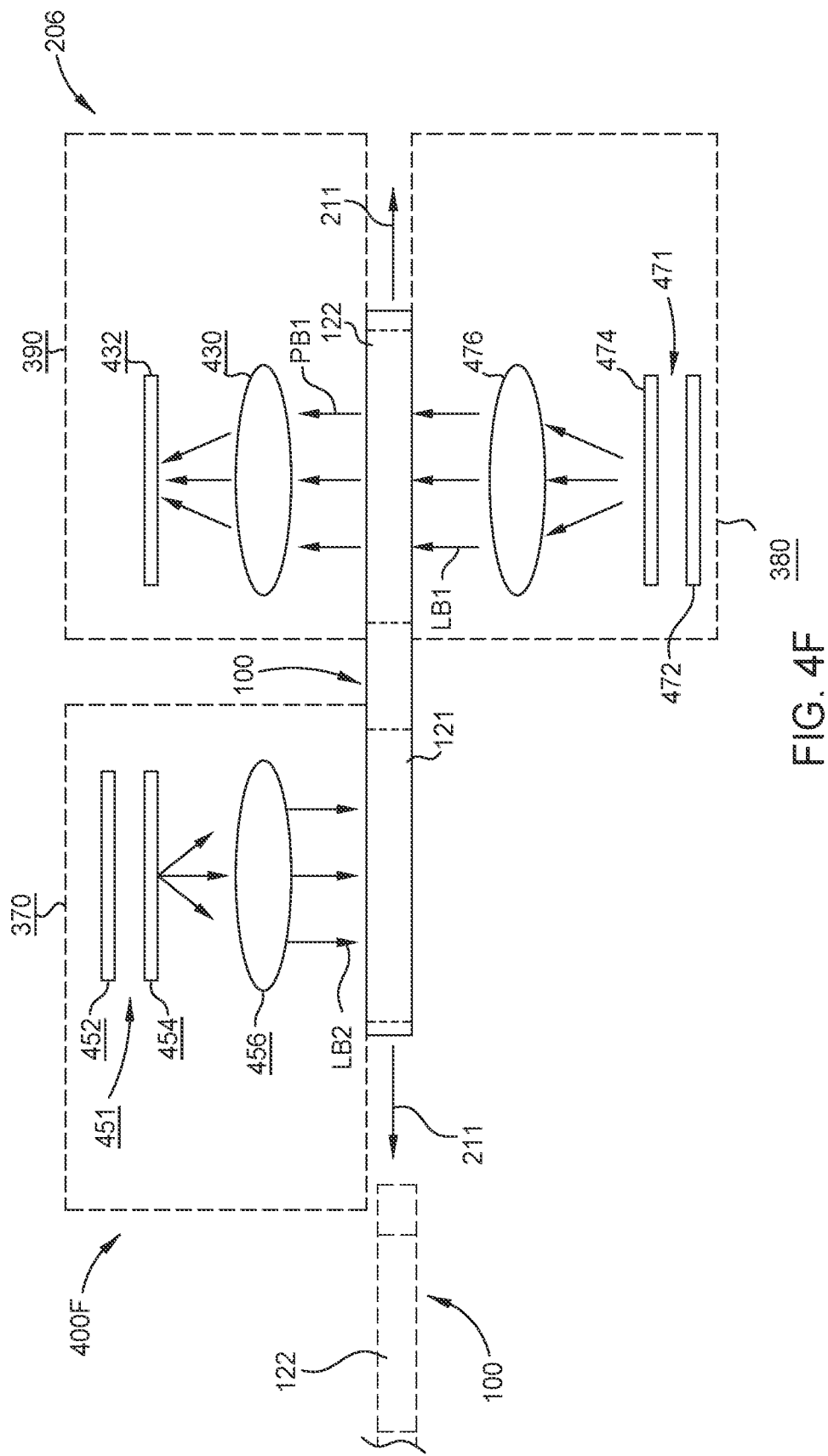
FIG. 4F is a schematic view of a configuration of the third subsystem shown in FIGS. 2 and 3C, according to one implementation.
Figure 4G:
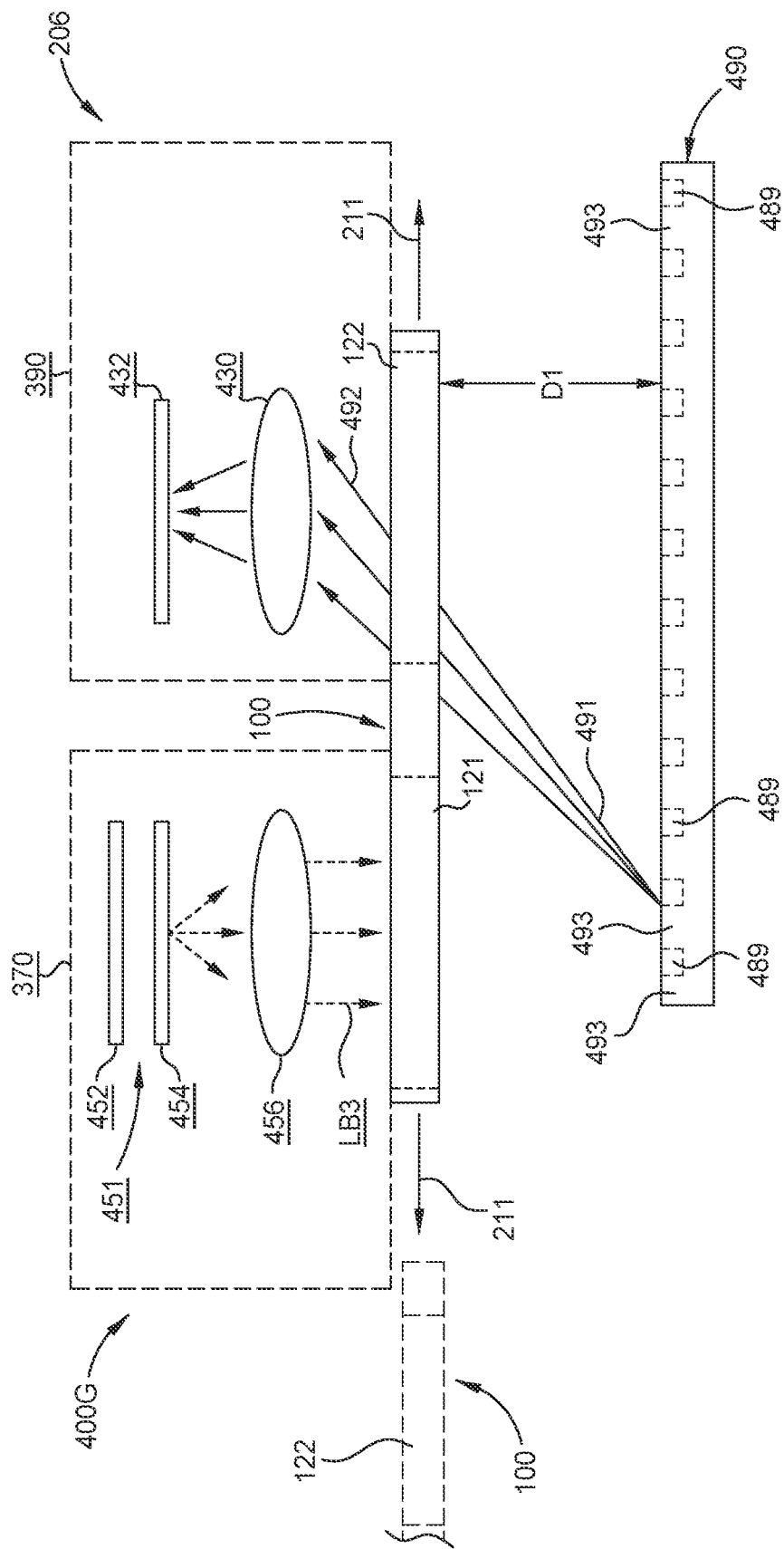
FIG. 4G is a schematic view of a configuration of the third subsystem shown in FIGS. 2 and 3C, according to one implementation.

FIG. 4D is a schematic view of a configuration 400D of the first subsystem 202 shown in FIGS. 2 and 3A, according to one implementation. The configuration 400D includes the first light engine 310, the first detector 312, and the second detector 316. The first light engine 310 includes the first light source 402, the first projection structure 404, a first lens 406a positioned between the first illuminator 401, and a lens 406b positioned between the first lens 406a and the stage path 211. The first light engine 310 includes an adjustable aperture 407 positioned between the lens 406b and the first lens 406a. The adjustable aperture 407 can be formed in a plate 415. The adjustable aperture 407 can be adjusted by moving the adjustable aperture 407 upward and downward (such as by moving the plate 415) and/or by opening and closing the adjustable aperture 407.

The first light engine 310 can include the one or more devices 413 shown in FIG. 4A positioned between the lens 406b and the stage path 211. The first detector 312 includes a second lens 410 and a first camera 412. The second detector 316 includes a third lens 414 and a second camera 416. In one embodiment, which can be combined with other embodiments, each of the first lens 406, the first lens 406a, the lens 406b, the second lens 410 and/or the third lens 414 is formed of the same convex lens structure having the same radius of curvature. Each of the first lens 406, the first lens 406a, the lens 406b, the second lens 410 and/or the third lens 414 has the same lens structure. Using the same lens structure for the lenses facilitates compensating for optic aberrations, such as aberrations in reflection and/or transmission of light.

FIG. 4E is a schematic view of a configuration 400E of the second subsystem 204 shown in FIGS. 2 and 3B, according to one implementation. The configuration 400E includes the second light engine 360 and the face illumination detector 318. The second light engine 360 includes a second illuminator 461 and a fourth lens 466 positioned between the second illuminator 461 and the stage path 211. The second illuminator 461 includes a second light source 462 and a second projection structure 464. The second projection structure 464 and the fourth lens 466 are oriented parallel to the stage path 211.

The second projection structure 464 includes one or more of a display and/or a reticle. In one embodiment, which can be combined with other embodiments, the second projection structure 464 includes one or more of a microdisplay, a spatial light modulator (SLM), and/or a reticle. In one example, which can be combined with other examples, the SLM includes one or more of a digital micromirror device (DMD) and/or a liquid crystal on silicon (LCOS) emitter.

The face illumination detector 318 includes a third camera 426, a fifth lens 424 positioned between the third camera 426 and the stage path 211, and an eye box blocker 420 positioned between the fifth lens 424 and the stage path 211. The eye box blocker 420 is adjacent a face level 422.

The optical device 100 is positioned to align the input coupler 121 with the second light engine 360, and to align the output coupler 122 with the face illumination detector 318. Second light beams B2 are directed from the second light engine 360 and toward the input coupler 121 of the optical device 100. The face illumination detector 318 captures a plurality of third images (in addition to the first images and the second images described in relation to FIG. 4A) of third projected light beams B3 that project from the output coupler 122 of the optical device 100.

The plurality of third images include the third projected light beams B3 that project from the output coupler 122 of the optical device 100 and past the eye box blocker 420 of the face illumination detector 318. The plurality of third images are processed (such as by using the controller 208) to determine one or more second metrics of the optical device. The one or more second metrics include a display leakage metric.

FIG. 4F is a schematic view of a configuration 400F of the third subsystem 206 shown in FIGS. 2 and 3C, according to one implementation. The third subsystem 206 includes the third light engine 370 mounted above the stage path 211 and configured to direct upper light beams toward the stage path 211, and a fourth light engine 380 mounted below the stage path 211 and configured to direct lower light beams toward the stage path 211.

The configuration 400F includes a detector 390 mounted above the stage path 211 and configured to receive projected light beams projected from the stage path 211. The projected light beams project from the optical device 100. The third light engine 370 includes the third illuminator 451 and the sixth lens 456. The detector 390 includes a lens 430 and a camera 432.

The fourth light engine 380 comprises a fourth illuminator 471 and a seventh lens 476 positioned between the fourth illuminator 471 and the stage path 211. The fourth illuminator 471 includes a fourth light source 472 and a fourth projection structure 474. The fourth projection structure 474 is a display or a reticle. In one embodiment, which can be combined with other embodiments, a see-through transmittance metric of the optical device 100 is obtained using the configuration 400F by illuminating the output coupling grating of the optical device 100 with the lower light beams emitted by the fourth light engine 380.

The input coupler 121 of the optical device 100 is aligned with the third light engine 370 and the output coupler 122 is aligned with the fourth light engine 380, as shown in FIG. 4F. The detector 390 is aligned (e.g., vertically) with the fourth light engine 380 and misaligned from the third light engine 370. The fourth light engine 380 directs first lower light beams LB1 toward the output coupler 122. Upper light beams LB2 can be directed toward the input coupler 121 of the optical device 100 from the third light engine 370. Using the detector 390, a plurality of first images are captured of the lower light beams LB1 that transmit through the output coupler 122 and project from the output coupler 122 as first projected light beams PB1. The optical device 100 is positioned away from the fourth light engine 380 to misalign the optical device 100 from the fourth light engine 380 (as shown in ghost in FIG. 4F for the optical device 100) and position the optical device 100 out of field-of-views of the fourth light engine 380 and the detector 390. Second light beams are directed from the fourth light engine 380 and toward the detector 390. The detector captures a plurality of second images of the second light beams that project from the waveguide combiner as second projected light beams. The first images and the second images are full-field images. The first light beams and the second light beams are emitted (sequentially, for example) from the light engine in a red spectrum, a green spectrum, and a blue spectrum. The plurality of first images and the plurality of second images respectively capture the first light beams and the second light beams in the red spectrum, the green spectrum, and the blue spectrum. In one embodiment, which can be combined with other embodiments, the second images are captured prior to the first images.

The second images are compared with the first images (such as by using the controller 208) to determine a see-through transmittance metric of the optical device 100. In one embodiment, which can be combined with other embodiments, the comparing includes comparing a second light intensity of the plurality of second images with a first light intensity of the plurality of first images FIG. 4G is a schematic view of a configuration 400G of the third subsystem 206 shown in FIGS. 2 and 3C, according to one implementation. The configuration 400G includes the detector 390, and the third light engine 370. The configuration 400G includes a patterned substrate 490 positioned below the stage path 211. The patterned substrate 490 includes a pattern design formed thereon. Each of the third light engine 370, the patterned substrate 490, and the detector 390 are positioned within the third body 201C of the third subsystem 206. In one embodiment, which can be combined with other embodiments, the patterned substrate 490 includes one or more of a plurality of protuberances 493 and/or a plurality of recesses 489 (shown in ghost in FIG. 4G) that form the pattern design.

In an aligned position shown in FIG. 4G, the patterned substrate 490 is aligned at least partially below the detector 390, and the patterned substrate 490 is misaligned at least partially from the third light engine 370. The optical device 100 below the detector 390 to align the optical device 100 with the detector 390, and the optical device 100 is positioned above the patterned substrate 490 at a distance D1 from the patterned substrate 490.

The patterned substrate 490 directs lower light beams 491 toward the optical device 100. The lower light beams 491 are reflected off of an upper surface of the patterned substrate 490 toward the optical device 100. The lower light beams 491 transmit through the optical device 100 and are captured using the detector 390. In one embodiment, which can be combined with other embodiments, the patterned substrate 490 reflects ambient light as the lower light beams 491. In one embodiment, which can be combined with other embodiments, the patterned substrate 490 reflects light from a light engine, such as the fourth light engine 380. In one embodiment, which can be combined with other embodiments, the configuration 400G includes the fourth light engine 380 configured to direct light beams toward the patterned substrate 490, and the patterned substrate 490 reflects the light beams from the fourth light engine 380 as the lower light beams 491. The third light engine 370 includes the third light source, the third projection structure 454, and the lens 456. The detector 390 includes the lens 430 and the camera 432.

The detector 390 captures a plurality of first images of projected light beams 492 that project from the output coupler 122 of the optical device 100 while the patterned substrate 490 is partially aligned with the detector 390 and partially misaligned from the detector 390 (as shown in FIG. 4G). The plurality of first images capture a red spectrum, a green spectrum, and a blue spectrum of the projected light beams 492. The plurality of first images are processed (such as by the controller 208) to determine one or more see-through metrics of the optical device 100.

The one or more see-through metrics include a see-through flare metric. For the see-through flare metric, the optical device 100 is positioned below the third light engine 370 to align the input coupler 121 of the optical device 100 with the third light engine 370. Light beams LB3 are directed from the third light engine 370 and toward the input coupler 121 of the optical device 100. In such an embodiment, the projected light beams 492 include light beams LB3 from the third light engine 370 and lower light beams 491 reflected from the patterned substrate 490. The light beams LB3 are emitted from the third light engine 370 in a light pattern design that is different from the pattern design of the patterned substrate 490.

The one or more see-through metrics include one or more of a see-through distortion metric and/or a see-through transmittance metric. For the see-through distortion metric and/or the see-through transmittance metric, the projected light beams 492 include lower light beams 491 reflected from the patterned substrate 490. The optical device 100 is positioned away from the detector 390 to misalign the optical device 100 from the detector and the patterned substrate 490 (as shown in ghost for the optical device 100 in FIG. 4G) and position the optical device 100 out of field-of-views of the patterned substrate 490 and the detector 390. The detector 390 captures a plurality of second images of reflected light beams that reflect from the patterned substrate 490 and toward the detector 390. The plurality of second images capture the reflected light beams in the red spectrum, the green spectrum, and the blue spectrum. The processing of the plurality of first images includes comparing the plurality of second images with the plurality of first images to determine the see-through distortion metric and/or the see-through transmittance metric. In one embodiment, which can be combined with other embodiments, the second images are captured prior to capturing of the first images.

The one or more see-through metrics include a see-through ghost image metric. For the see-through ghost image metric, the optical device 100 is positioned away from the detector 390 to misalign the optical device 100 from the detector 390 and the patterned substrate 490. The detector 390 captures a plurality of second images of reflected light beams that reflect from the patterned substrate 490 using the detector 390. The plurality of second images capture the reflected light beams in the red spectrum, the green spectrum, and the blue spectrum. The processing of the plurality of first images includes determining an offset between the plurality of second images and the plurality of first images. In one embodiment, which can be combined with other embodiments, the offset is an offset between the pattern design (such as a reticle) in the first images and the pattern design (such as a reticle) in the second images.

Figure 5:
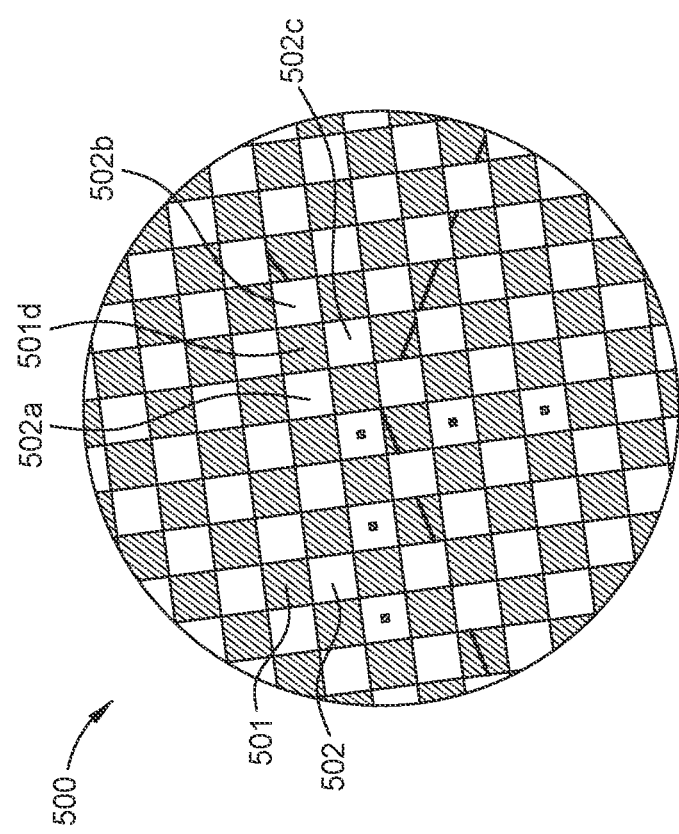
FIG. 5 is a schematic view of an image, according to one implementation.

FIG. 5 is a schematic view of an image 500, according to one implementation. The image 500 includes a light pattern design (such as a reticle) having dark sections 501 and bright sections 502. The image 500 can be used to determine the contrast metric and/or the angular uniformity metric.

For the angular uniformity metric, the processing includes comparing one or more first sections 502a of the light pattern design with one or more second sections 502b, 502c of the light pattern design within the image 500. The first and second sections 502a, 502b, 502c correspond to bright sections 502. The processing includes comparing light intensities of the one or more first sections 502a with light intensities of the one or more second sections 502b, 502c. The sections 502a, 502b, 502c are disposed at different radii relative to a center of the image 500.

For the contrast metric, the processing includes comparing a light intensity of one or more bright sections 502a of the light pattern design with a light intensity of one or more dark sections 501a of the light pattern design within the image 500. The bright section 502a has a light intensity/1 and the dark section 501a has a light intensity/2. The contrast metric can be determined and represented by the following Equation 1 as "C":

$$C = \frac{I1 - I2}{I1 + I2} \quad \text{(Equation 1)}$$

Figure 6A:
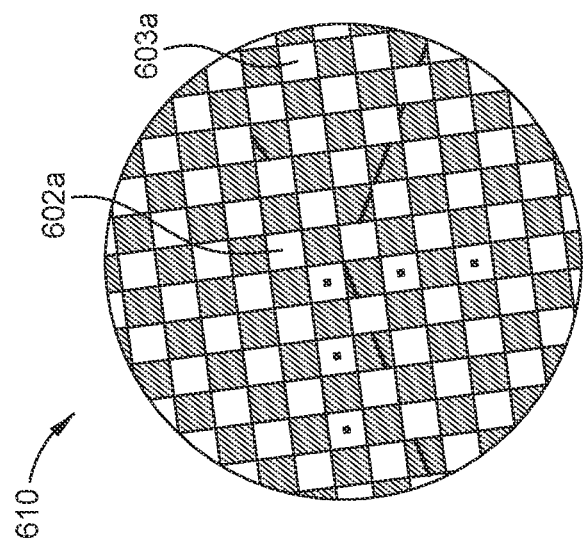
FIGS. 6A-6C are schematic views of images, according to one implementation.
Figure 6B:
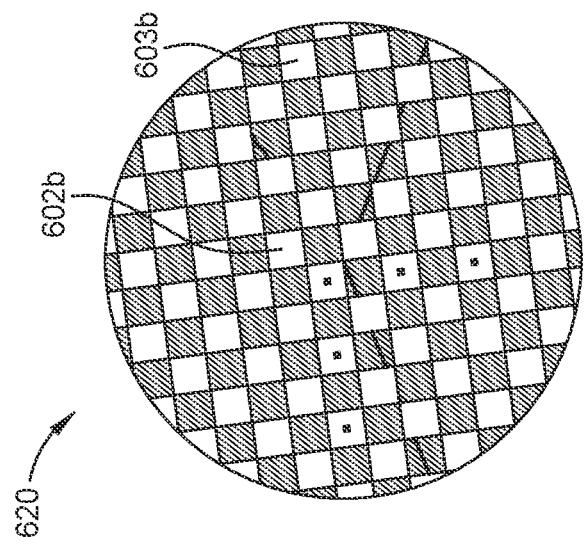
Figure 6C:
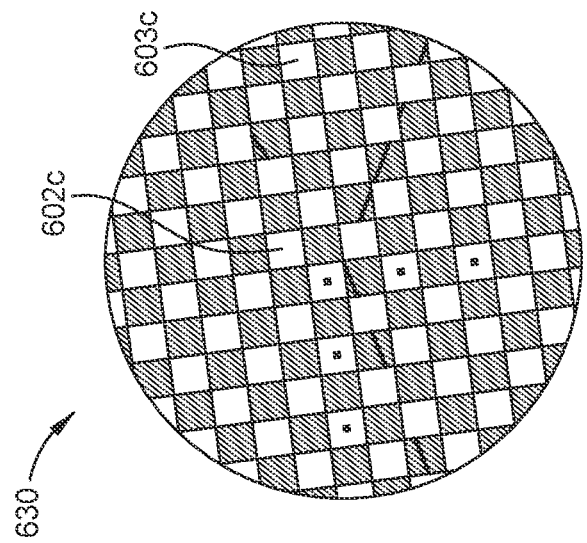

FIGS. 6A-6C are schematic views of images 610, 620, 630, according to one implementation. FIG. 6A shows a red image 610, FIG. 6B shows a green image 620, and FIG. 6C shows a blue image 630. The images 610, 620, 630 are used to determine the color uniformity metric. The processing includes comparing the images 610, 620, 630 using the same field area in each respective image 610, 620, 630. The same field area includes one or more bright sections 602a-602c, 603a-603c at the same position in each image 610, 620, 630. The color uniformity metric can represent a ratio of light intensities of the one or more bright sections 602a-602c, 603a-603c in each image 610, 620, 630.

Figure 7A:
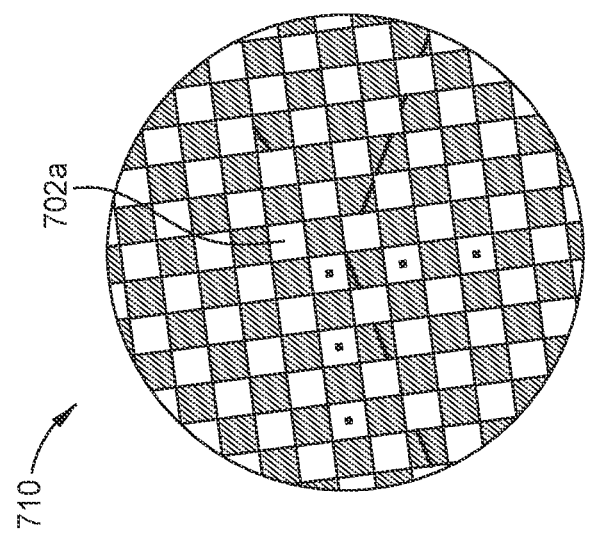
FIGS. 7A-7C are schematic views of images, according to one implementation.
Figure 7B:
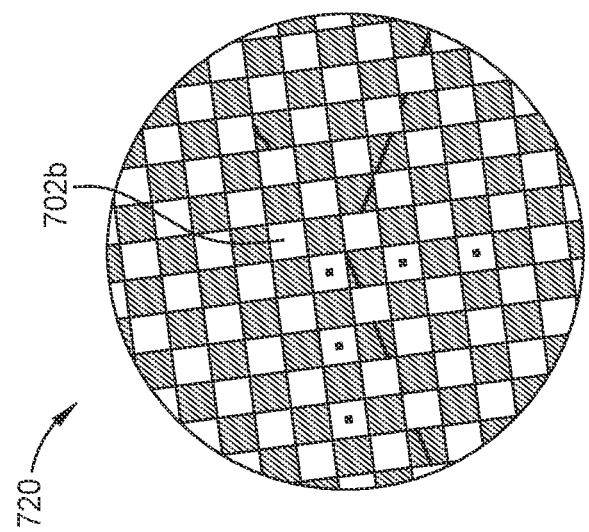
Figure 7C:
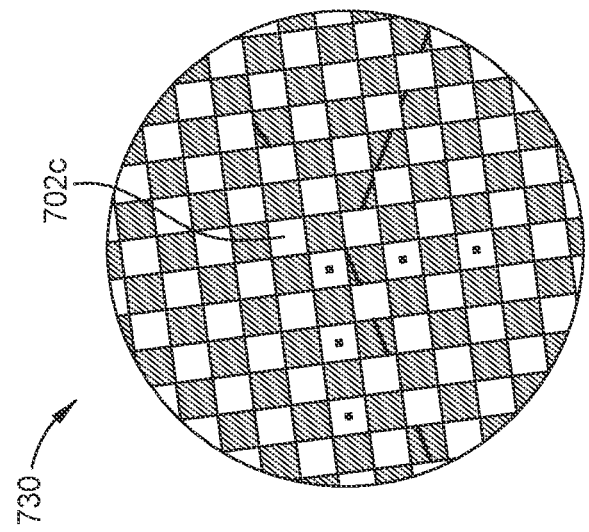

FIGS. 7A-7C are schematic views of images 710, 720, 730, according to one implementation. FIG. 7A shows a calibration image 710, FIG. 7B shows a first image (e.g., a reflected image), and FIG. 7C shows a second image (e.g., a transmitted image). The images 710, 720, 730 can be used to determine the efficiency metric.

The processing includes comparing the calibration image 710 with the first image 720 and the second image 730 using the same field area in each respective image 710, 720, 730. The same field area includes one or more bright sections 702a-702c at the same position in each image 710, 720, 730. The processing includes comparing light intensities of the one or more bright sections 702a-702c in the images 710, 720, 730. The calibration image 710 includes a light intensity IC1 for the bright section 702a, the first image 720 includes a light intensity IR1 for the bright section 702b, and the second image 730 includes a light intensity IT1 for the bright section 702c.

The efficiency metric can be determined and represented by the following Equation 2 as "E":

$$E = \left(\frac{IR1}{IC1}\right) * \left(\frac{IT1}{IC1}\right) \quad \text{(Equation 2)}$$

Figure 8:
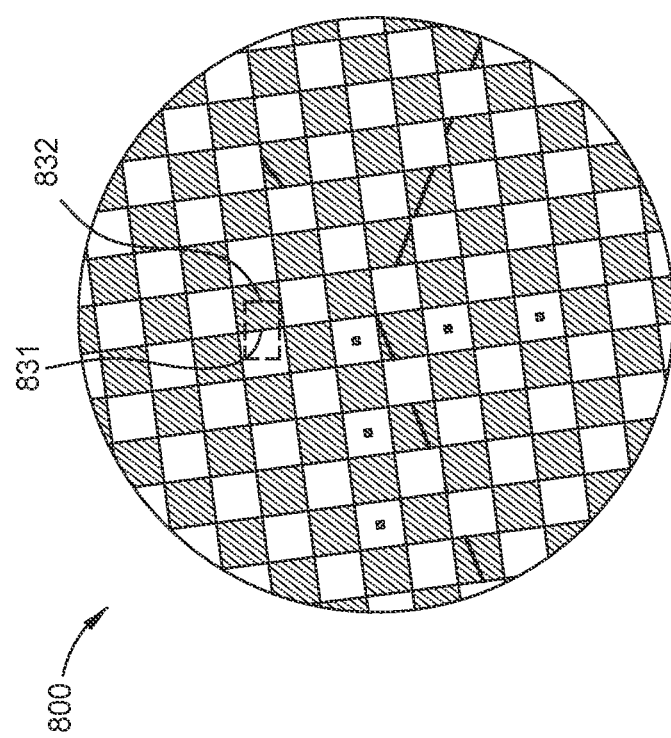
FIG. 8 is a schematic view of an image, according to one implementation.

FIG. 8 is a schematic view of an image 800, according to one implementation. The image 800 includes a light pattern design (such as a reticle) having dark sections and bright sections. The image 800 can be used to determine the MTF metric. The processing includes comparing an edge area 832 of the one or more calibration images with the same edge area (e.g., the same position within the image) of the same one or more sections of one or more of the plurality of first images or the plurality of second images. The edge area 832 at least partially encompasses an outer edge 831 of one or more sections (such as a bright section).

Figure 9:
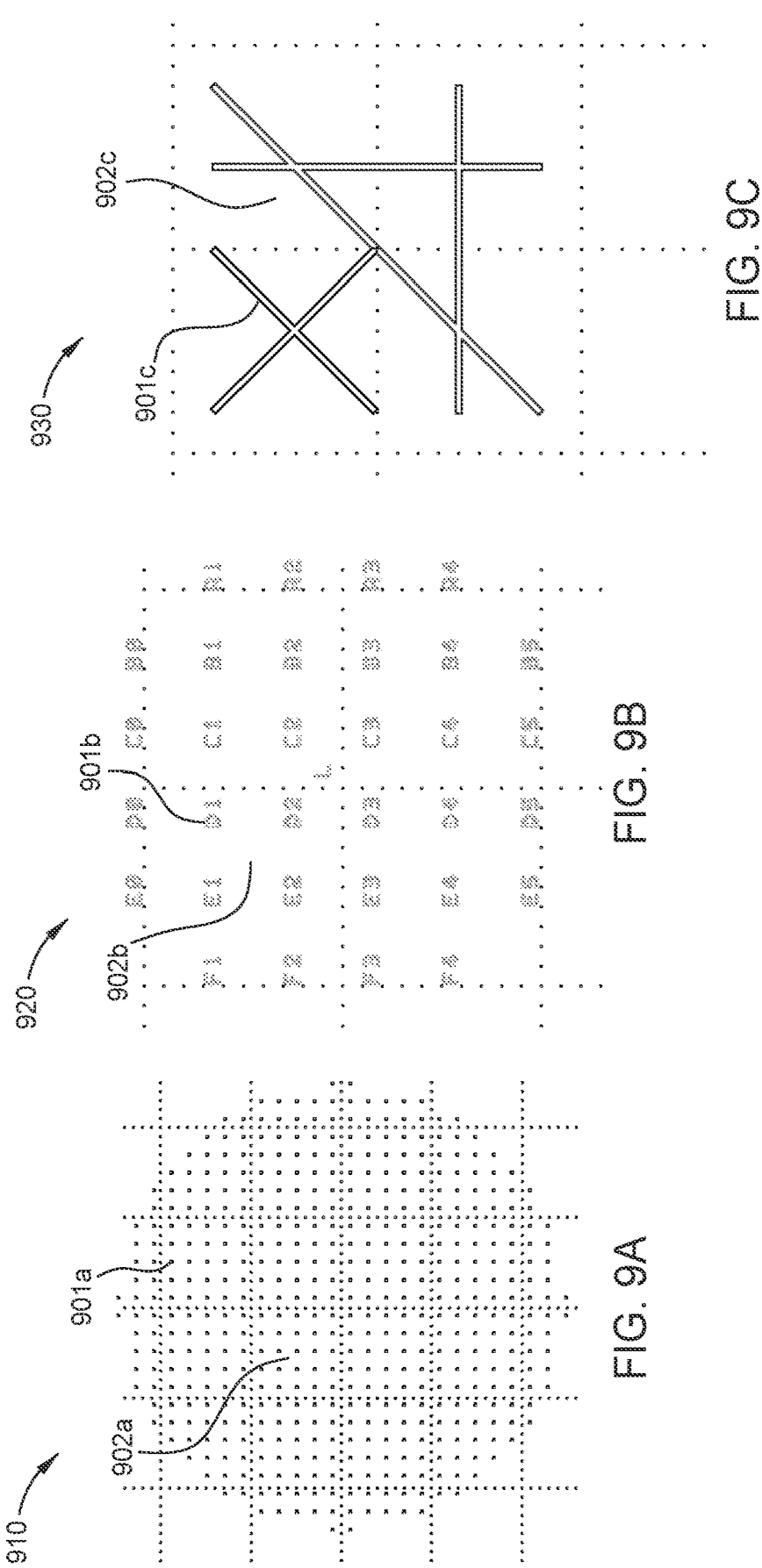
FIGS. 9A-9C are schematic views of images, according to one implementation.

FIGS. 9A-9C are schematic views of images 910, 920, 930, according to one implementation. Each of the images 910, 920, 930 shows a light pattern design that can be used for light directed by the first light engine 310, the first light engine 370, the second light engine 360, the first light engine 370, the second light engine 380, the second light engine 322, and/or the patterned substrate 490. Each of the images 910, 920, 930 can be used to determine the ghost image metric and/or other metrics (such as other first metrics). Each of the images 910, 920, 930 respectively includes a plurality of dark sections 901a-901c and a plurality of bright sections 902a-902c.

Figure 10:
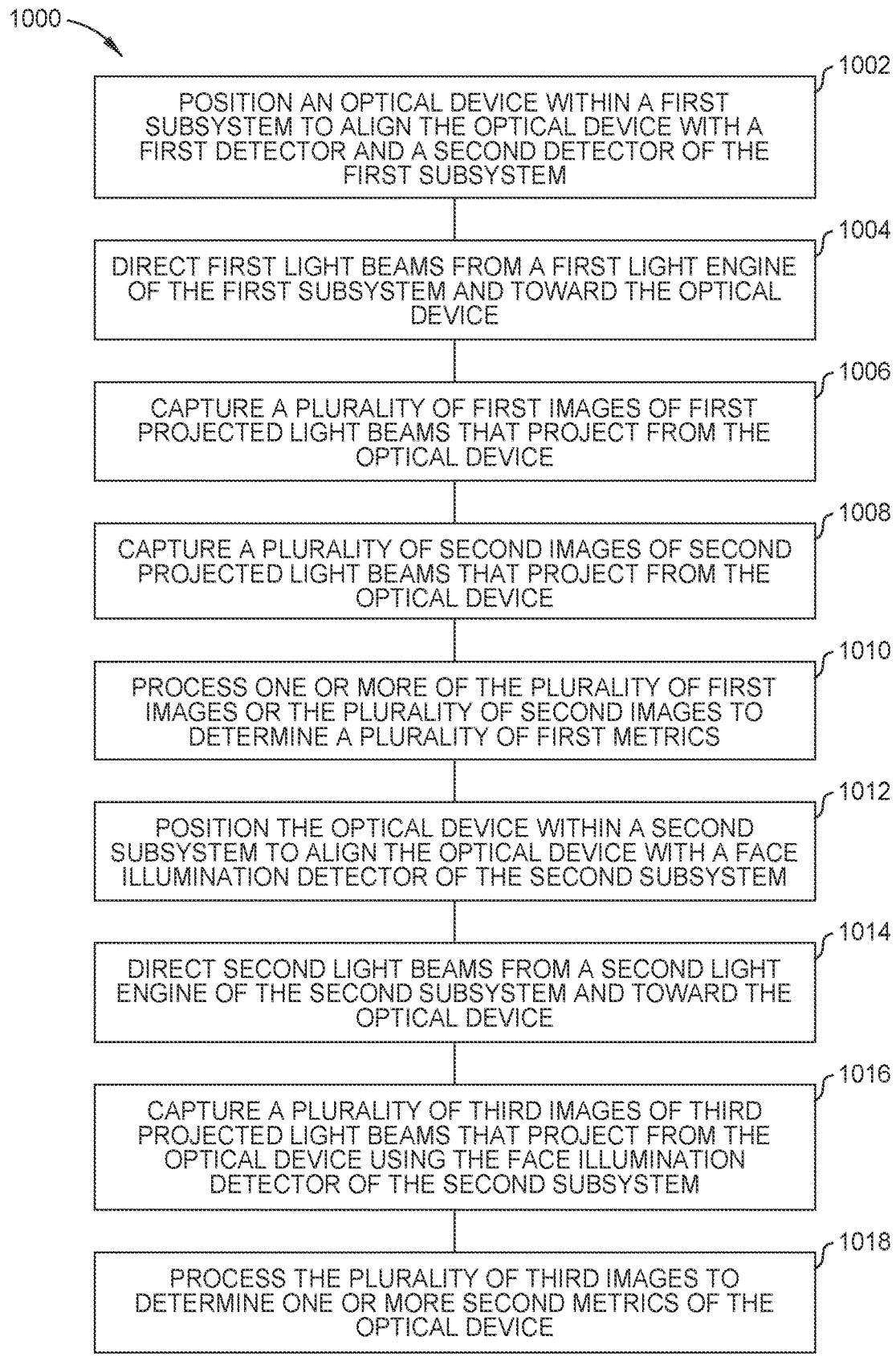
FIG. 10 is a schematic block diagram view of a method of analyzing optical devices, according to one implementation.

FIG. 10 is a schematic block diagram view of a method 1000 of analyzing optical devices, according to one implementation.

Operation 1002 of the method 1000 includes positioning an optical device within a first subsystem to align the optical device with a first detector and a second detector of the first subsystem.

Operation 1004 includes directing first light beams from a first light engine of the first subsystem and toward the optical device. In one embodiment, which can be combined with other embodiments, the directing includes turning the first light beams along a 90 degree turn toward the stage path.

Operation 1006 includes capturing a plurality of first images of first projected light beams that project from the optical device using the first detector of the first subsystem.

Operation 1008 includes capturing a plurality of second images of second projected light beams that project from the optical device using the second detector of the first subsystem.

Operation 1010 includes processing one or more of the plurality of first images or the plurality of second images to determine a plurality of first metrics of the optical device. The first metrics include an angular uniformity metric, a contrast metric, an efficiency metric, a color uniformity metric, a modulation transfer function (MTF) metric, a field of view (FOV) metric, a ghost image metric, and/or an eye box metric.

Operation 1012 includes positioning the optical device within a second subsystem to align the optical device with a face illumination detector of the second subsystem.

Operation 1014 includes directing second light beams from a second light engine of the second subsystem and toward the optical device.

Operation 1016 includes capturing a plurality of third images of third projected light beams that project from the optical device using the face illumination detector of the second subsystem.

Operation 1018 includes processing the plurality of third images to determine one or more second metrics of the optical device. The one or more second metrics include a display leakage metric.

Figure 11:
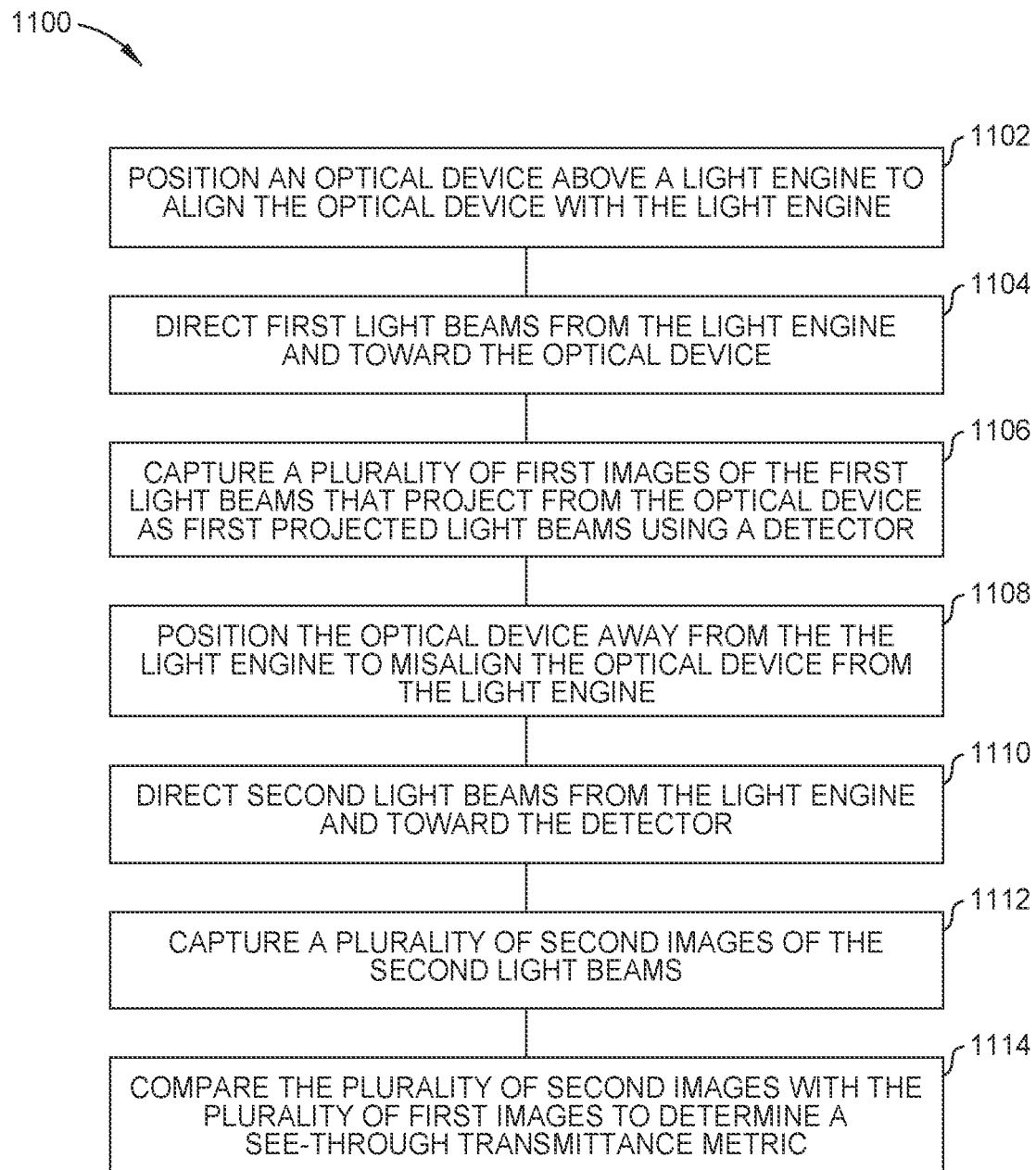
FIG. 11 is a schematic block diagram view of a method of analyzing optical devices, according to one implementation.

FIG. 11 is a schematic block diagram view of a method 1100 of analyzing optical devices, according to one implementation.

Operation 1102 of the method 1100 includes positioning an optical device above a light engine to align the optical device with the light engine.

Operation 1104 includes directing first light beams from the light engine and toward the optical device.

Operation 1106 includes capturing a plurality of first images of the first light beams that project from the optical device as first projected light beams using a detector.

Operation 1108 includes positioning the optical device away from the light engine to misalign the optical device from the light engine.

Operation 1110 includes directing second light beams from the light engine and toward the detector.

Operation 1112 includes capturing a plurality of second images of the second light beams.

Operation 1114 includes comparing the plurality of second images with the plurality of first images to determine a see-through transmittance metric of the optical device.

Figure 12:
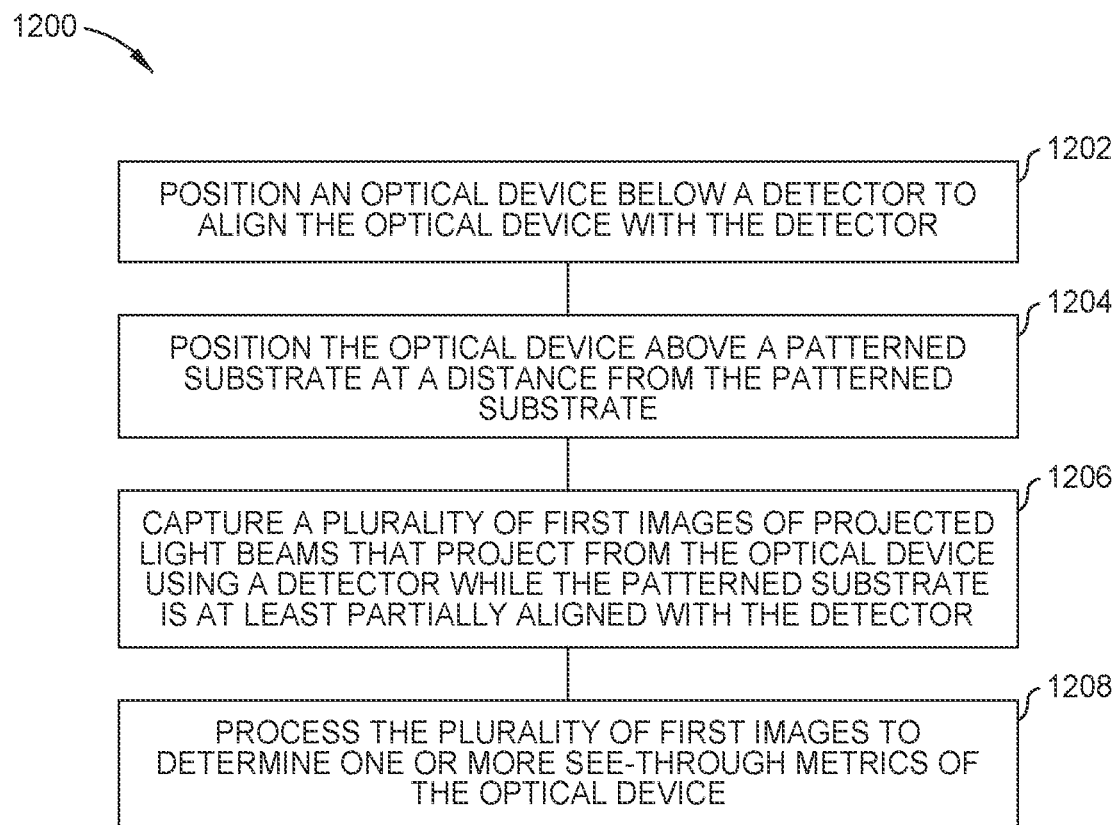
FIG. 12 is a schematic block diagram view of a method of analyzing optical devices, according to one implementation.

FIG. 12 is a schematic block diagram view of a method 1200 of analyzing optical devices, according to one implementation.

Operation 1202 of the method 1200 includes positioning an optical device below a detector to align the optical device with the detector.

Operation 1204 includes positioning the optical device above a patterned substrate at a distance from the patterned substrate. The patterned substrate includes a pattern design formed thereon.

Operation 1206 includes capturing a plurality of first images of projected light beams that project from the optical device using a detector while the patterned substrate is at least partially aligned with the detector.

Operation 1208 includes processing the plurality of first images to determine one or more see-through metrics of the optical device. The one or more see-through metrics include one or more of a see-through transmittance metric, a see-through distortion metric, a see-through flare metric, and/or a see through ghost image metric.

Benefits of the present disclosure include using a single optical device metrology system 200 to determine multiple metrology metrics (such as a display leakage metric, one or more see-through metrics, and one or more other metrology metrics) for a plurality of optical devices (such as waveguide combiners) on a single system using a single stage path 211. In one embodiment, which can be combined with other embodiments, a single system using a single stage path 211 can be used to determine a display leakage metric, an angular uniformity metric, a contrast metric, an efficiency metric, a color uniformity metric, a modulation transfer function (MTF) metric, a field of view (FOV) metric, a ghost image metric, an eye box metric, a see-through distortion metric, a see-through flare metric, a see-through ghost image metric, and a see-through transmittance metric. Benefits also include increased throughput, reduced delays and costs, and enhanced efficiencies. The throughput is increased via the utilization of a feeding system coupled to each subsystem of the optical device metrology system.

It is contemplated that one or more aspects disclosed herein may be combined. As an example, one or more aspects, features, components, and/or properties of the optical device metrology system 200, the first subsystem 202, the second subsystem 204, the third subsystem 206, the configuration 400A, the configuration 400B, configuration 400C, the configuration 400D, the configuration 400E, the configuration 400F, the configuration 400G, the image 500, the images 610-630, the images 710-730, the image 800, the images 910-930, the method 1000, the method 1100, and/or the method 1200 may be combined. As an example, one or more of the operations described in relation to the optical device metrology system 200, the subsystems 202, 204, 206, and/or the configurations 400A-400G can be combined with one or more of the operations described in relation to the method 1000, the method 1100, and/or the method 1200. Moreover, it is contemplated that one or more aspects disclosed herein may include some or all of the aforementioned benefits.

While the foregoing is directed to embodiments of the present disclosure, other and further embodiments of the disclosure may be devised without departing from the basic scope thereof, and the scope thereof is determined by the claims that follow.

What is claimed is:

1. An optical device metrology system, comprising:
a stage configured to move a tray along a stage path;
a light engine mounted above the stage path and configured to direct light beams toward the stage path;

a patterned substrate positioned below the stage path, the patterned substrate comprising a pattern design formed thereon;

a detector mounted above the stage path and configured to receive projected light beams projected from the stage path; and a controller in communication with the stage, the light engine, and the detector, the controller comprising instructions that, when executed, cause:

the stage to position an optical device below the detector to align an output coupler of the optical device with the detector, and align an input coupler of the optical device with the light engine;

the stage to position the optical device above the patterned substrate at a distance from the patterned substrate;

the detector to capture a plurality of first images of projected light beams that project from the output coupler of the optical device while the patterned substrate is at least partially aligned with the detector, and the plurality of first images capturing a red spectrum, a green spectrum, and a blue spectrum of the projected light beams; and processing the plurality of first images to determine a plurality of see-through metrics of the optical device, the plurality of see-through metrics including a see-through flare metric, a see-through distortion metric, a see-through transmittance metric, and a see-through ghost image metric.

2. The optical device metrology system of claim 1, wherein the instructions, when executed further cause:

the stage to position the optical device below the light engine to align the optical device with the light engine; and the light engine to direct first light beams from the light engine and toward the optical device, the projected light beams including the first light beams from the light engine and second light beams reflected from the patterned substrate.

3. The optical device metrology system of claim 1, wherein the projected light beams include first light beams reflected from the patterned substrate, and the instructions, when executed, further cause:

the stage to position the optical device away from the detector to misalign the optical device from the detector and the patterned substrate; and the detector to capture a plurality of second images of reflected light beams that reflect from the patterned substrate while the patterned substrate is at least partially aligned with the detector, the plurality of second images capturing the red spectrum, the green spectrum, and the blue spectrum.

4. The optical device metrology system of claim 3, wherein the processing of the plurality of first images includes comparing the plurality of second images with the plurality of first images.

5. The optical device metrology system of claim 4, wherein the processing of the plurality of first images includes determining an offset between the plurality of second images and the plurality of first images.

6. An optical device metrology system, comprising:
a stage configured to move a tray along a stage path;
a light engine mounted above the stage path and configured to direct light beams toward an input coupler of an optical device to be positioned on the stage path;

a patterned substrate positioned below the stage path, the patterned substrate comprising a pattern design formed thereon; and a detector mounted above the stage path and configured to receive projected light beams projected from an output coupler of the optical device to be positioned on the stage path.

7. The optical device metrology system of claim 6, further comprising a body having a first opening and a second opening to allow the stage to move through the first opening and the second opening.

8. The optical device metrology system of claim 7, wherein each of the light engine, the patterned substrate, and the detector are positioned within the body.

9. The optical device metrology system of claim 8, wherein the light engine comprises an illuminator and a first lens positioned between the illuminator and the stage path, the illuminator comprising a light source and a projection structure.

10. The optical device metrology system of claim 9, wherein the projection structure comprises one or more of a microdisplay, a spatial light modulator (SLM), or a reticle.

11. The optical device metrology system of claim 10, wherein the detector comprises a camera and a second lens positioned between the camera and the stage path.

12. The optical device metrology system of claim 11, wherein the patterned substrate is aligned at least partially below the detector, and the patterned substrate is misaligned at least partially from the light engine.

13. The optical device metrology system of claim 6, further comprising a controller in communication with the light engine and the detector, the controller comprising instructions that, when executed, determine one or more of a see-through transmittance metric, a see-through distortion metric, a see-through flare metric, or a see through ghost image metric.

14. A method of analyzing optical devices, comprising:
positioning an optical device below a detector to align an output coupler of the optical device with the detector and align an input coupler of the optical device with a light engine;

positioning the optical device above a patterned substrate at a distance from the patterned substrate, the patterned substrate comprising a pattern design formed thereon;

capturing a plurality of first images of projected light beams that project from the output coupler of the optical device using a detector while the patterned substrate is at least partially aligned with the detector, and the plurality of first images capturing a red spectrum, a green spectrum, and a blue spectrum of the projected light beams; and processing the plurality of first images to determine one or more see-through metrics of the optical device.

15. The method of claim 14, wherein the patterned substrate includes one or more of a plurality of protuberances or a plurality of recesses that form the pattern design.

16. The method of claim 14, wherein the one or more see-through metrics include a see-through flare metric, and the method further comprises:

positioning the optical device below the light engine to align the optical device with the light engine; and directing first light beams from the light engine and toward the optical device, the projected light beams including the first light beams from the light engine and second light beams reflected from the patterned substrate.

17. The method of claim 16, wherein the first light beams are emitted in a light pattern design that is different from the pattern design of the patterned substrate.

18. The method of claim 14, wherein the one or more see-through metrics include one or more of a see-through distortion metric or a see-through transmittance metric, the first projected light beams include first light beams reflected from the patterned substrate, and the method further comprises:
- positioning the optical device away from the detector to misalign the optical device from the detector and the patterned substrate; and
- capturing a plurality of second images of reflected light beams that reflect from the patterned substrate using the detector, the patterned substrate at least partially aligned with the detector, and the plurality of second images capturing the reflected light beams in the red spectrum, the green spectrum, and the blue spectrum.

19. The method of claim 18, wherein the processing of the plurality of first images includes comparing the plurality of second images with the plurality of first images.

20. The method of claim 14, wherein the one or more see-through metrics include a see-through ghost image metric, and the method further comprises:
- positioning the optical device away from the detector to misalign the optical device from the detector and the patterned substrate; and
- capturing a plurality of second images of reflected light beams that reflect from the patterned substrate using the detector, the patterned substrate at least partially aligned with the detector, and the plurality of second images capturing the reflected light beams in the red spectrum, the green spectrum, and the blue spectrum, the processing of the plurality of first images includes determining an offset between the plurality of second images and the plurality of first images.

* * * * *